United States Patent
Ponson et al.

(10) Patent No.: US 12,352,663 B2
(45) Date of Patent: Jul. 8, 2025

(54) METHOD AND APPARATUS FOR ANALYZING A STRUCTURE

(71) Applicants: SORBONNE UNIVERSITE, Paris (FR); CENTRE NATIONAL DE LA RECHERCHE SCIENTIFIQUE, Paris (FR)

(72) Inventors: Laurent Ponson, Paris (FR); Estelle Berthier, Vanves (FR); Ashwij Mayya, Paris (FR)

(73) Assignees: SORBONNE UNIVERSITE, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 207 days.

(21) Appl. No.: 17/906,950

(22) PCT Filed: Mar. 23, 2021

(86) PCT No.: PCT/EP2021/057433
§ 371 (c)(1),
(2) Date: Sep. 21, 2022

(87) PCT Pub. No.: WO2021/191206
PCT Pub. Date: Sep. 30, 2021

(65) Prior Publication Data
US 2023/0375434 A1 Nov. 23, 2023

(30) Foreign Application Priority Data
Mar. 23, 2020 (FR) ............................. 2002824

(51) Int. Cl.
*G01M 5/00* (2006.01)
(52) U.S. Cl.
CPC .................. *G01M 5/0066* (2013.01)

(58) Field of Classification Search
None
See application file for complete search history.

(56) References Cited

U.S. PATENT DOCUMENTS

| 4,870,271 A | 9/1989 | Philips |
| 2008/0088462 A1* | 4/2008 | Breed ............. G01S 15/04 340/573.1 |

(Continued)

OTHER PUBLICATIONS

International Search Report and Written Opinion received for PCT/EP2021/057433, mailed Jun. 25, 2021.

(Continued)

*Primary Examiner* — Raul J Rios Russo
*Assistant Examiner* — Carl F. R. Tchatchouang
(74) *Attorney, Agent, or Firm* — Greer, Burns & Crain, Ltd

(57) ABSTRACT

A method for analyzing a structure, including
a measurement of a duration T, a mechanical S or acoustic energy $S_{ac}$ and/or a spatial extension $\xi$ of a sequence and/or a number of mechanical or acoustic events N or $N_{ac}$ in that sequence and/or of the mechanical A or acoustic $A_{ac}$ energies of the events of that sequence, and/or
a measurement of a mechanical energy A or acoustic energy $A_{ac}$ of an event, and/or of a temporal frequency of mechanical events dN/dt or acoustic events $dN_{ac}/dt$, and/or of a dissipated mechanical energy rate dE/dt or of an acoustic energy rate $dE_{ac}/dt$ at the time of that event, and
according to the measurement of an event and/or the measurement of a sequence of events, a calculation by technical means of a data r representative of a state of health of the structure or of a time $t_c$ to failure of the structure.

22 Claims, 12 Drawing Sheets

(56) References Cited

U.S. PATENT DOCUMENTS

2008/0108372 A1* 5/2008 Breed ................. G01M 5/0008
                                                    340/8.1
2018/0136085 A1* 5/2018 Lochry ............... G01M 5/0091
2018/0340858 A1* 11/2018 Jahanbin ................ G01N 29/11

OTHER PUBLICATIONS

French Search Report received for Application No. 2002824, dated Nov. 23, 2020.
Carpinteri, A., et al., "Cracking and crackling in concrete-like materials: A dynamic energy balance," Engineering Fracture Mechanics 155, 2016, pp. 130-144.
Sibil, A., et al., "Optimization of Acoustic Emission Data Clustering by a Genetic Algorithm Method," J Nondestruct Eval 31, 2012, pp. 169-180.

* cited by examiner

[Fig. 1]
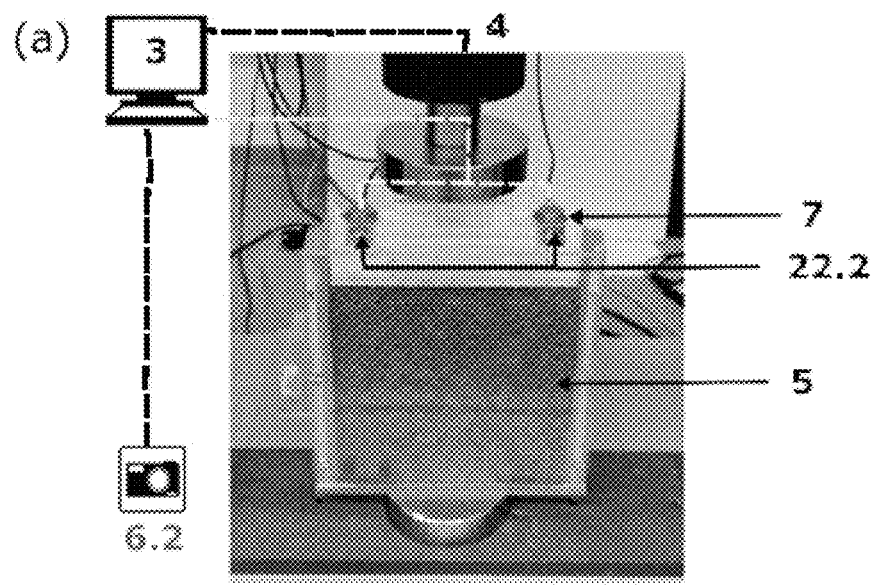
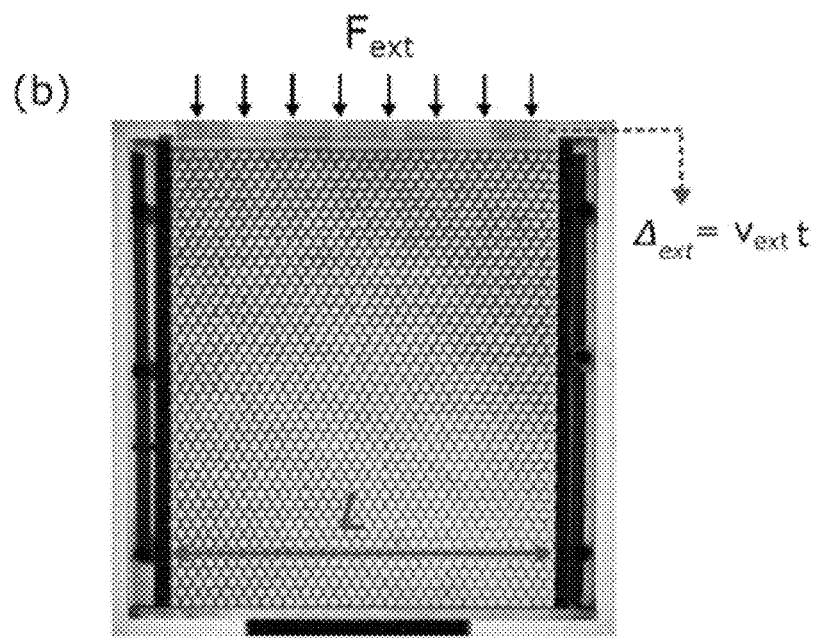

[Fig. 2]
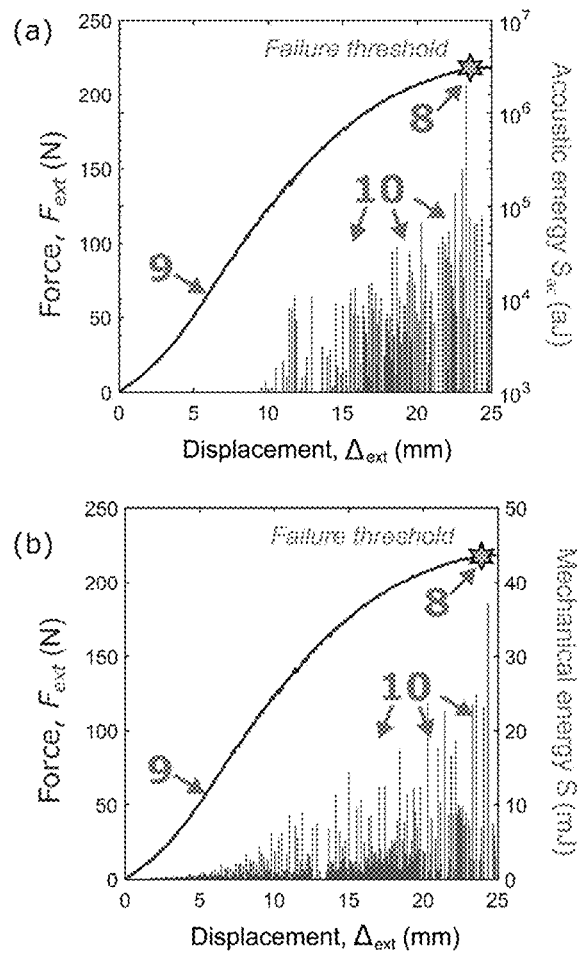
[Fig. 3]
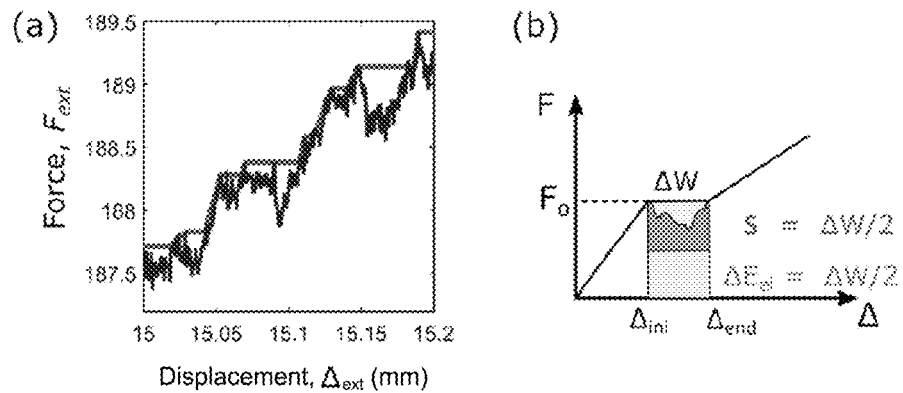

[Fig. 4]
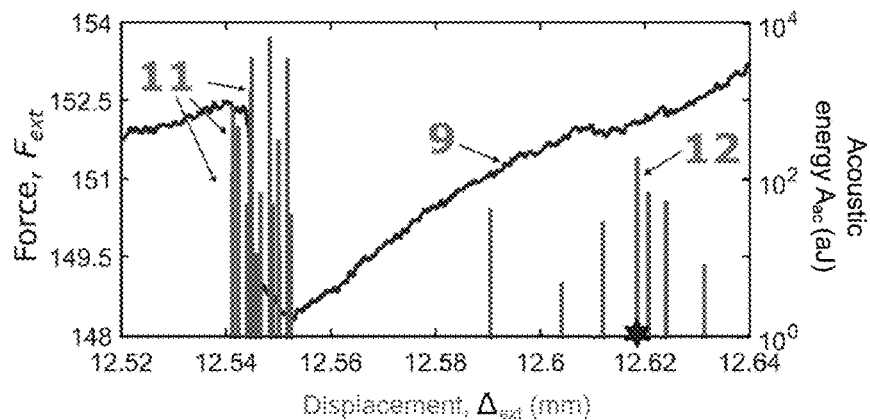
[Fig. 5]
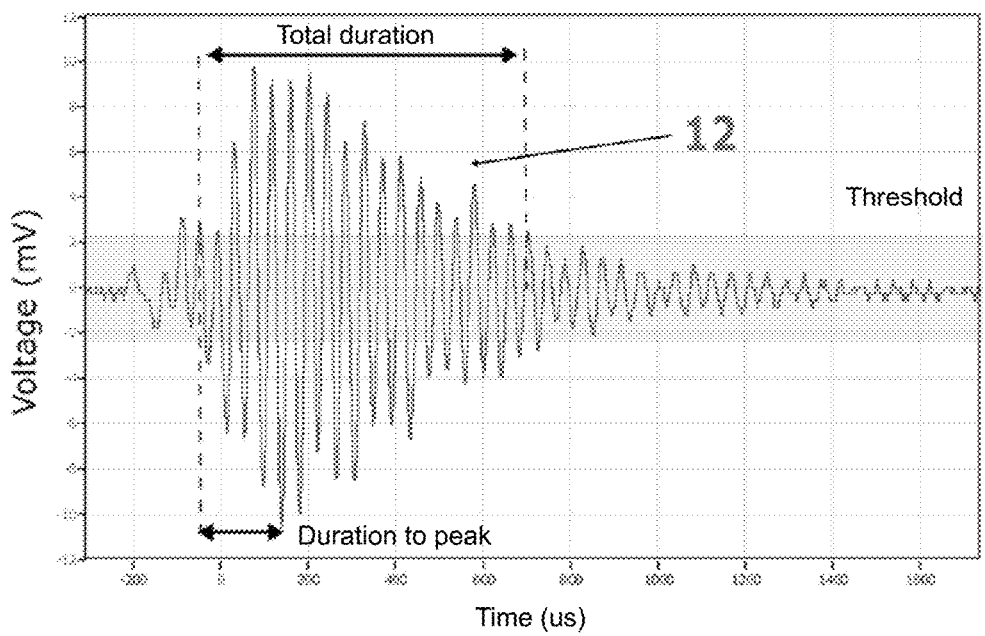

[Fig. 6]
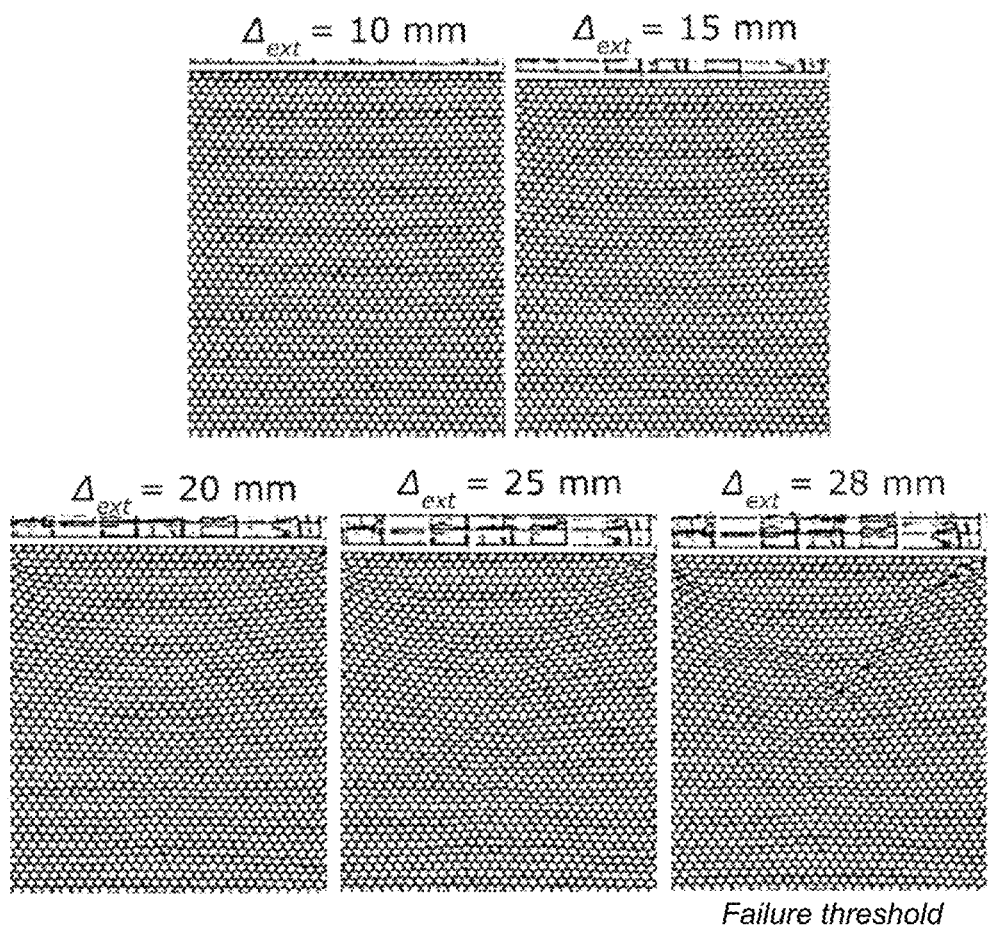
Failure threshold

[Fig. 7]
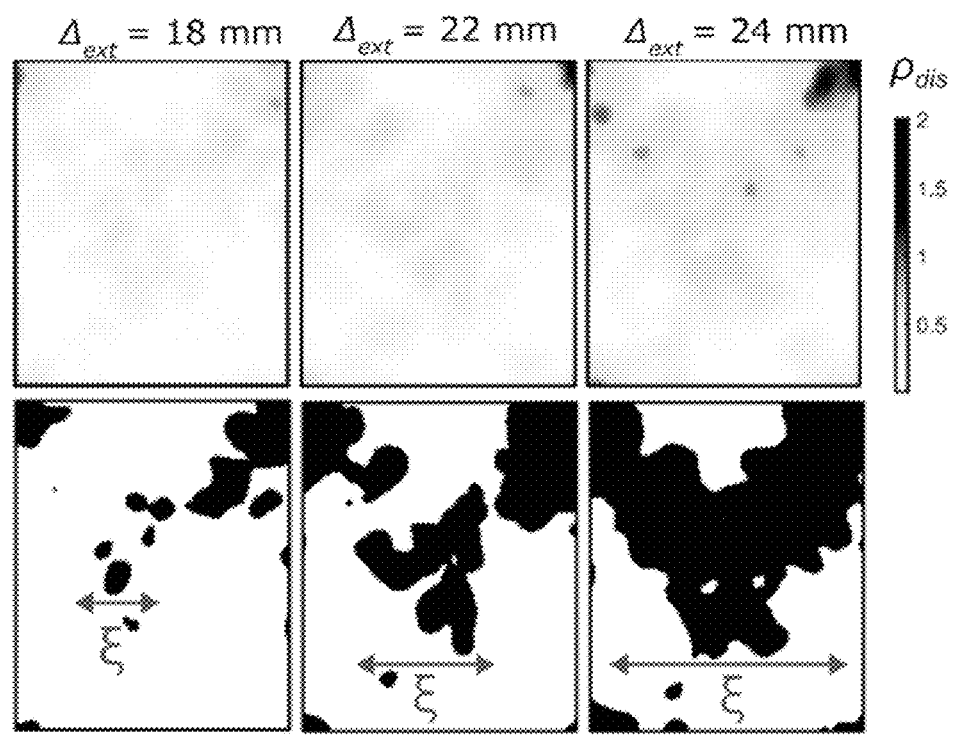

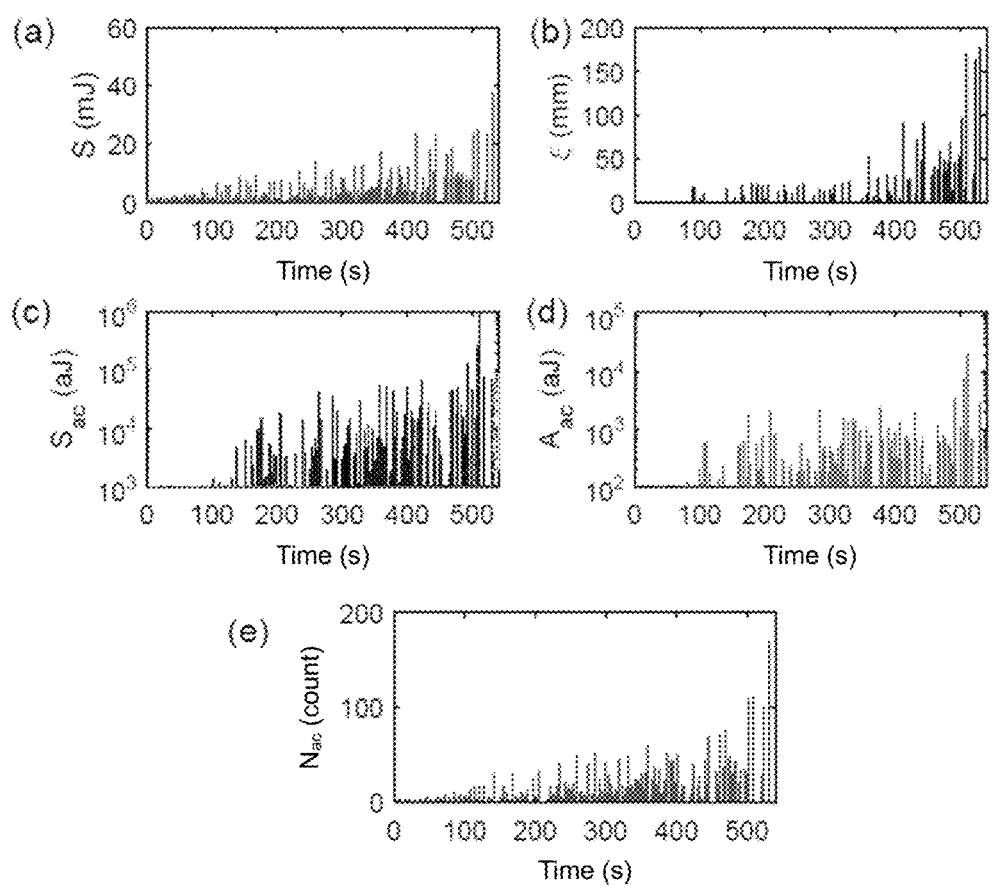
[Fig. 8]

[Fig. 9]
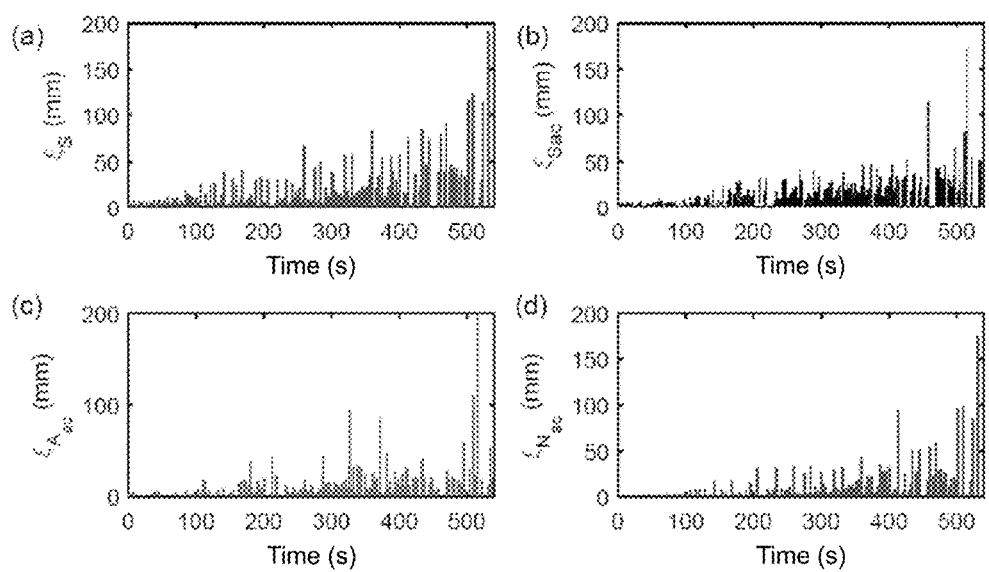

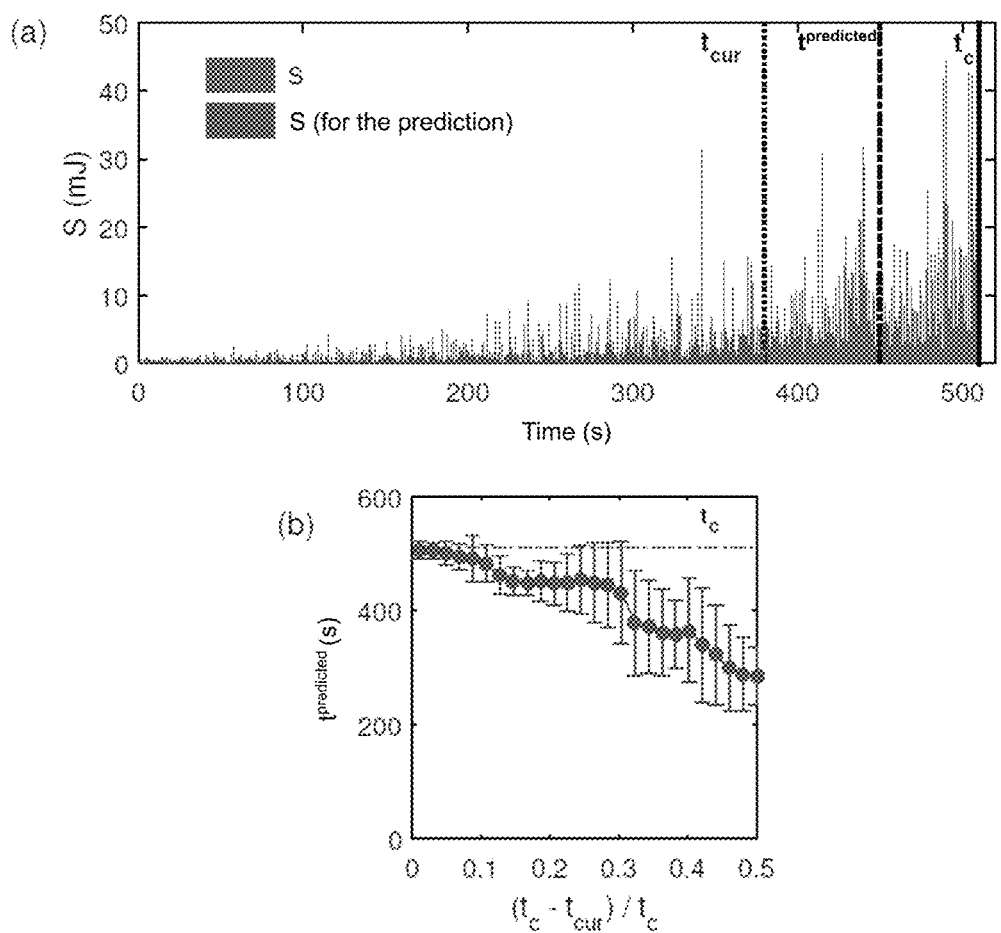
[Fig. 10]

[Fig. 11]
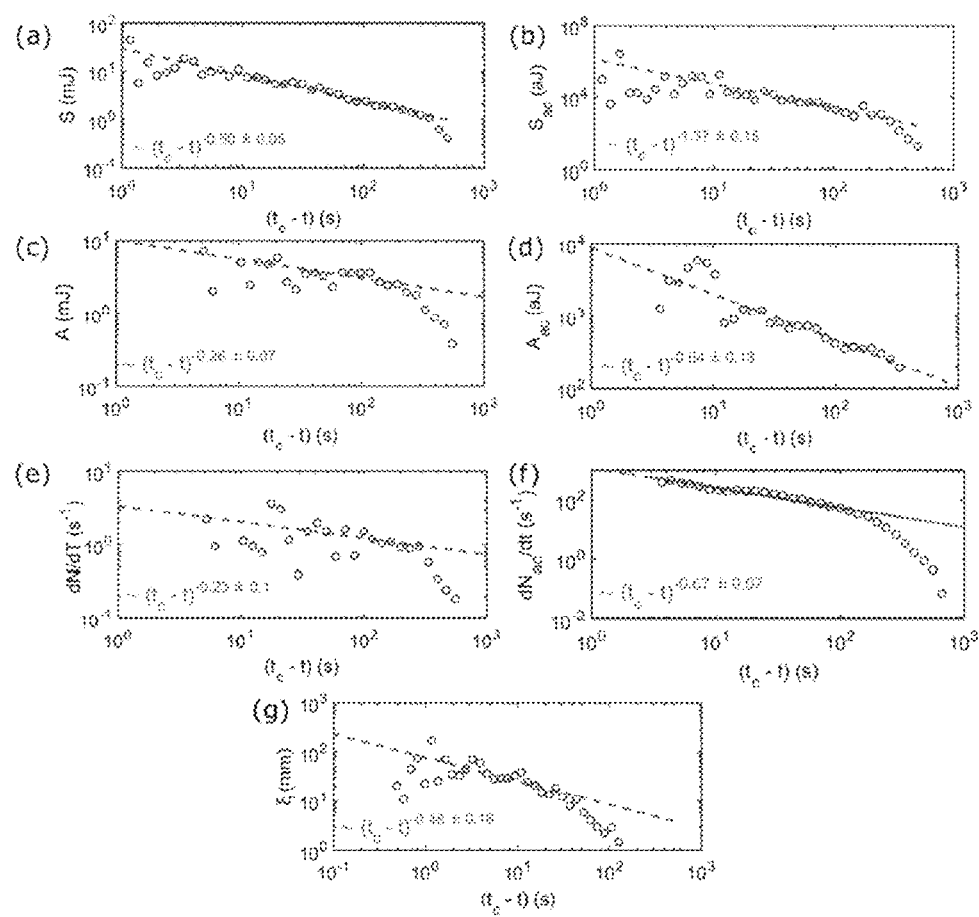

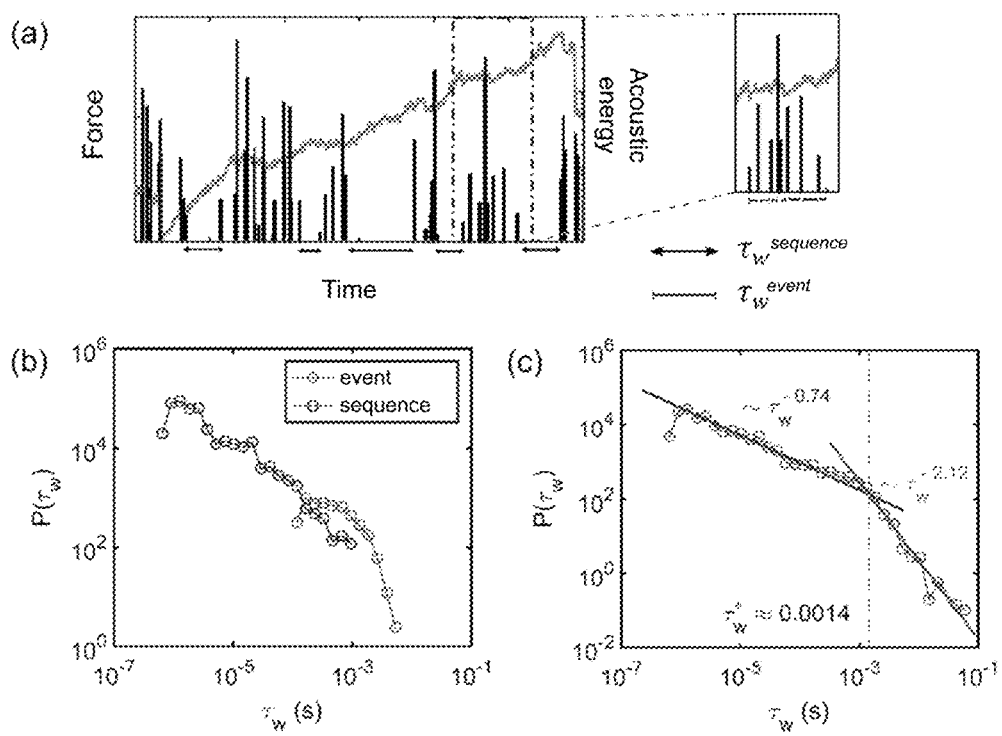
[Fig. 12]

[Fig. 13A]
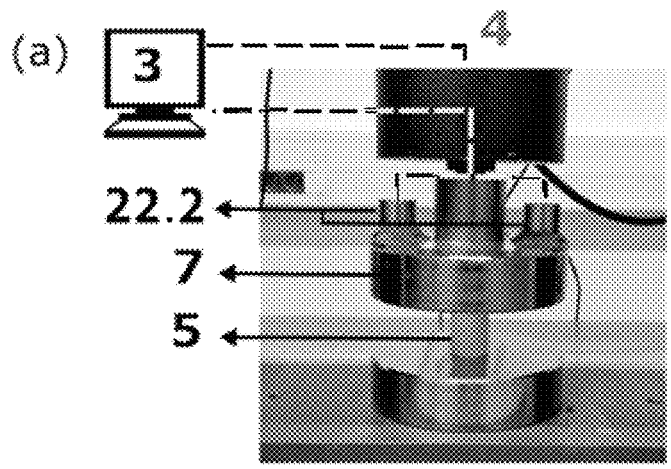
[Fig. 13B]
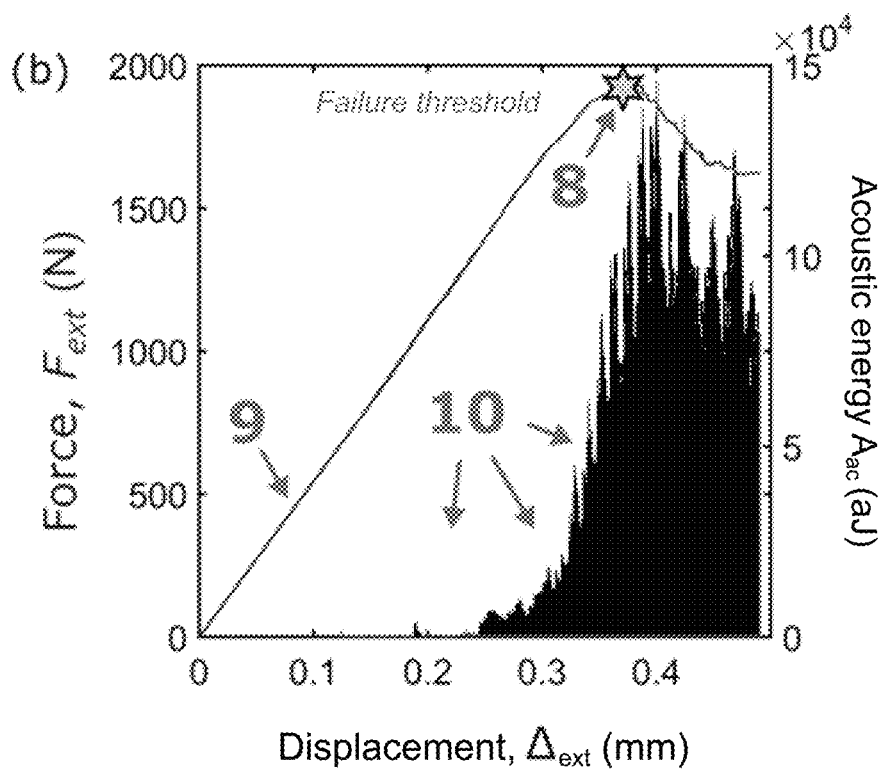

[Fig. 13C]
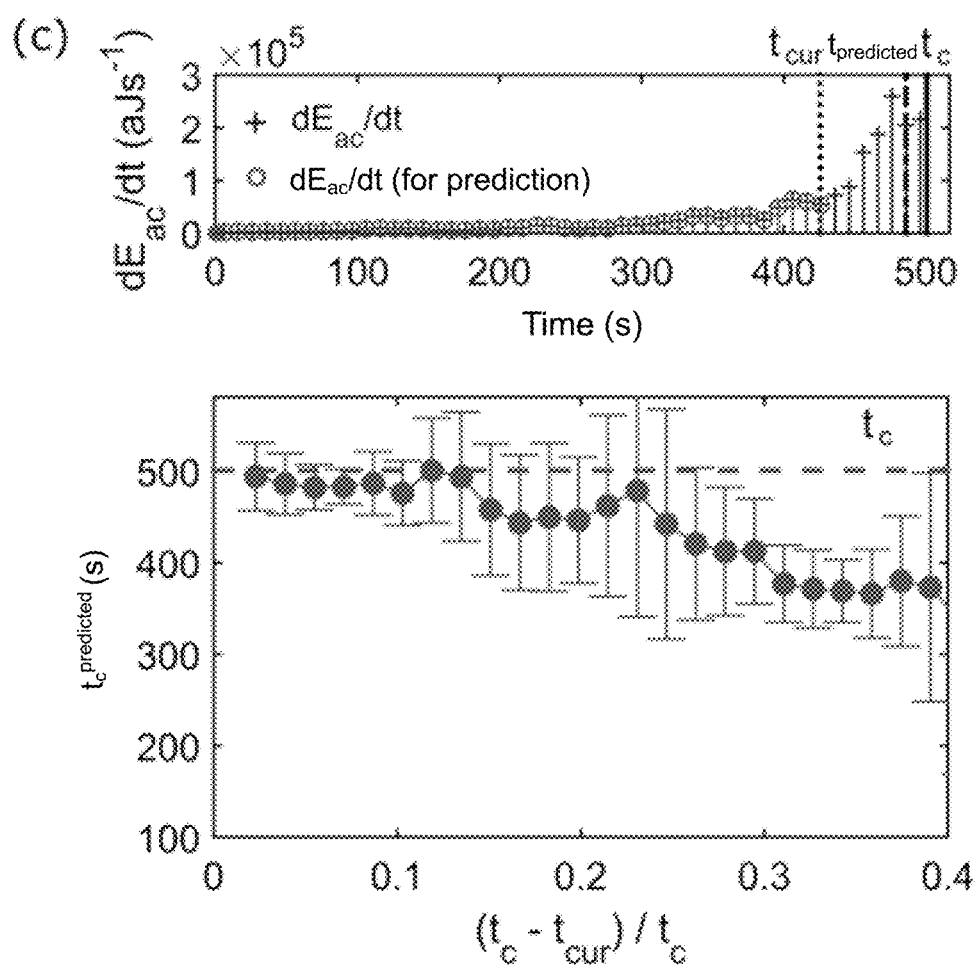

METHOD AND APPARATUS FOR ANALYZING A STRUCTURE

BACKGROUND

The present invention relates to a method for analyzing the mechanical health of a solid or structure. It also relates to a device for carrying out this method.

Such a device allows a user to monitor a structure such as a bridge or a building. The field of the invention is more particularly, but not exclusively, civil engineering, mechanical engineering, and the transport and energy sectors.

Techniques are known according to the state of the art called post-mortem or failure analysis of a structure, which are based on analyzing fragments of a broken material after the failure of that structure.

It is also known that the techniques according to the state of the art are positioned in the field of structure monitoring, which is an engineering science that consists of monitoring the mechanical health of a structure by measuring its mechanical response during its use by means of sensors.

However, as a drawback, such monitoring techniques often lack robustness, being limited to a use case corresponding to a type of material used in a type of structure. Anticipating the failure of structures and solids in contexts as varied as civil engineering with the monitoring of concrete structures or transportation with the monitoring of devices made of metal alloys or polymer-based composites remains a major challenge for engineers.

To implement such an approach, however, there are many sensors that make it possible to "listen to" and monitor the structures over time, such as strain gauges or microphones to record the acoustic signals emitted by the structure. These signals generally show an extremely intermittent change in the mechanical response of structures, characterized by short periods of high activity, separated by periods of silence. This is called "crackling noise", which shows some similarity with the dynamics of earthquakes. For about twenty years, research has been conducted in an attempt to understand and describe these signals. However, deciphering these signals and thus using them to anticipate the failure of a structure is still out of reach as their statistical properties and their link with the change in the mechanical health of the structure remain poorly understood, which is a drawback.

The purpose of the present invention is to at least partially solve at least one of these drawbacks of the state of the art.

SUMMARY

We propose to achieve this goal with a method for analyzing a structure, comprising:
for at least one sequence of several events located inside the structure, each event being a mechanical damage event or an acoustic event:
  a measurement of a sequence of said events comprising a measurement by technical means of measurement of a duration T, a mechanical S or acoustic energy $S_{ac}$ and/or a spatial extension $\xi$ of that sequence and/or a number of mechanical N or acoustic $N_{ac}$ events in that sequence and/or of the mechanical A or acoustic $A_{ac}$ energies of the events of that sequence, and/or
  a measurement of an event comprising a measurement by the technical means of measurement of a mechanical energy A or acoustic energy $A_{ac}$ of this event, and/or of a temporal frequency of mechanical events dN/dt or acoustic events $dN_{ac}/dt$ at the time of this event, and/or of a dissipated mechanical energy rate dE/dt or of an acoustic energy rate $dE_{ac}/dt$ at the time of this event and
  according to the measurement of an event and/or the measurement of a sequence of events, a calculation by technical means of calculation of a data r representative of a state of health of the structure or of a time $t_c$ to failure of the structure.

The measurement of a sequence of events may comprise a measurement by the technical means of measurement of a duration T of that sequence of events.

The measurement of a sequence of events may comprise a measurement by the technical means of measurement of a mechanical energy S or acoustic energy $S_{ac}$ of that sequence of events.

The measurement of mechanical energy S or acoustic energy $S_{ac}$ can be obtained by several sensors spatially distributed around and/or inside the structure.

The measurement of a sequence of events may comprise a measurement by the technical means of measurement of a spatial extension $\xi$ of that sequence of events.

The measurement of an event may comprise a measurement by the technical means of measurement of a mechanical energy A or acoustic energy $A_{ac}$ of that event.

The measurement of a sequence of events may comprise a measurement by the technical means of measurement of the number of mechanical events N or acoustic events $N_{ac}$ in that sequence.

The measurement of an event may comprise a measurement by the technical means of measurement of a time frequency of mechanical events dN/dt or acoustic events $dN_{ac}/dt$.

The measurement of an event may include a measurement by the technical means of a dissipated mechanical energy rate dE/dt or an acoustic energy rate $dE_{ac}/dt$.

The calculation may comprise a calculation of the data r representative of the health status of the structure.

The data r can be calculated as equal to or proportional to the ratio $\xi/L$ where L is a characteristic size of the structure or material composing the structure and $\xi$ the measurement of a spatial extension $\xi$ of a sequence of events.

The data r can be calculated as equal to or proportional to the ratio $\xi/L$ where L is a characteristic size of the structure or material composing the structure, $\xi$ depending on the measurement of the energy respectively S or $S_{ac}$ of a sequence of events, $\xi$ depending on:
  a constant, respectively $A_0$ or $A_{ac0}$ and a constant $d_0$, and/or
  respectively S or $S_{ac}$ by a relation relating $\xi$ to $S^{1/df}$ or $S_{ac}^{1/(\alpha \cdot df)}$ respectively,
$d_f$ being a constant, $\alpha$ being a constant
$\xi$ depending on S or $S_{ac}$ preferably respectively by the relation:
respectively $d_0 \cdot (S/A_0)^{1/df} = \xi$ or $$d_0 \cdot (S_{ac}/A_{ac0})^{1/(\alpha \cdot df)} = \xi$$

$\alpha$ may be substantially equal to 2.6, and/or $d_f$ may be substantially equal to 1.1 for a two-dimensional structure and substantially equal to 1.5 for a three-dimensional structure.

The data r can be calculated as equal to or proportional to the ratio $\xi/L$ where L is a characteristic size of the structure or material composing the structure, $\xi$ depending on the measurement of the duration T of a sequence of events, $\xi$ depending on:

a constant $\tau_0$ and a constant $d_0$, and/or

T by a relation relating $\xi$ to $(T)^{1/z}$, z being a constant preferably substantially equal to 0.57, $\xi$ preferably depending on T by the relation $\xi=(T/\tau_0)^{1/z} \cdot d_0$ In particular, the system according to the invention may comprise:

a measurement of $\tau_0$ as the smallest measured event duration of the at least one sequence, and/or a measurement of $A_0$ or $A_{ac0}$ respectively as the energy of the smallest mechanical or acoustic events measured from the at least one sequence.

The data r can be calculated as equal to or proportional to the ratio $\xi/L$ where L is a characteristic size of the structure or material of the structure, $\xi$ depending on the measurement of the respectively mechanical A or acoustic $A_{ac}$ energy of that event, $\xi$ depending on:

a constant, respectively $A_0$ or $A_{ac0}$ and a constant $d_0$, and/or respectively A or $A_{ac}$ by a relation relating $\xi$ to $A^{2/df}$ or $A_{ac}^{2/(\alpha \cdot df)}$ respectively, $d_f$ being a constant, $\alpha$ being a constant $\xi$ depending on A or $A_{ac}$ respectively preferably by the relation:

respectively $d_0 \cdot (A/A_0)^{2/df} = \xi$ or $$d_0 \cdot (A_{ac}/A_{ac0})^{2/(\alpha \cdot df)} = \xi$$

The data r can be calculated as equal to or proportional to the ratio $\xi/L$ where L is a characteristic size of the structure or material of the structure, $\xi$ depending on the measurement of the number of respectively mechanical N or acoustic $N_{ac}$ events in that sequence, $\xi$ depending on:

a constant $d_0$, and/or respectively N or $N_{ac}$ by a relation relating $\xi$ to $N^{2/df}$ or $N_{ac}^{2/(\alpha \cdot df)}$ respectively, $d_f$ being a constant, $\alpha$ being a constant $\xi$ depending on N or $N_{ac}$ respectively preferably by the relation:

respectively $d_0 \cdot (N)^{2/df} = \xi$ or $$d_0 \cdot (N_{ac})^{2/(\alpha \cdot df)} = \xi$$

The data r can be calculated as equal or proportional to the ratio $\xi/L$ with L a characteristic size of the structure or material composing the structure, $\xi$ depending on the measurement of the frequency of respectively mechanical dN/dt or acoustic $dN_{ac}/dt$ events, $\xi$ depending on:

a constant $\Delta T_0$ and a constant $d_0$, and/or respectively dN/dt or $dN_{ac}/dt$ by a relation relating $\xi$ to $(dN/dt)^{2/df}$ or $(dN_{ac}/dt)^{2/(\alpha \cdot df)}$ respectively, $d_f$ being a constant, $\alpha$ being a constant $\xi$ depending on dN/dt or $dN_{ac}/dt$ respectively preferably by the relation:

respectively $d_0 \cdot (\Delta T_0 \cdot dN/dt)^{2/df} = \xi$ or $$d_0 \cdot (\Delta T_0 \cdot dN_{ac}/dt)^{2/(\alpha \cdot df)} = \xi$$

The data r can be calculated as equal or proportional to the ratio $\xi/L$ with L a characteristic size of the structure or material composing the structure, $\xi$ depending on the measurement of a dissipated mechanical energy rate dE/dt or an acoustic energy rate $dE_{ac}/dt$, $\xi$ depending on:

a constant respectively $\Delta T_{a0}$ or $\Delta T_{ac0}$, and a constant $d_0$, and/or respectively dE/dt or $dE_{ac}/dt$ by a relation relating $\xi$ to $(dE/dt)^{1/df}$ or $(dE_{ac}/dt)^{1/(\alpha \cdot df)}$, $d_f$ respectively, $\alpha$ being a constant $\xi$ depending on dE/dt or $dE_{ac}/dt$ respectively preferably by the relation:

respectively $d_0 \cdot (\Delta T_{a0} \cdot dE/dt)^{1/df} = \xi$ or $$d_0 \cdot (\Delta T_{ac0} \cdot dE_{ac}/dt)^{1/(\alpha \cdot df)} = \xi$$

The calculation can include the calculation of the time $t_c$.

The measurement of a sequence of events or the measurement of an event can be measured at a measurement time t, the calculation of the time $t_c$ preferably comprising a use and/or an interpolation and/or a regression of a function (the expression interpolation and/or a regression of a function can mean here generally a description by a function) connecting $t_c$, t and one of T, S, $S_{ac}$, $\xi$, N, $N_{ac}$, A, $A_{ac}$, dN/dt and $dN_{ac}/dt$ (and even optionally dE/dt and $dE_{ac}/dt$) or the temporal evolution of one of T, S, $S_{ac}$, $\xi$, N, $N_{ac}$, A, $A_{ac}$, dN/dt and $dN_{ac}/dt$ (and even optionally dE/dt and $dE_{ac}/dt$)

said function preferably comprising:

$S=B_0/(t_c-t)^\beta$ where $B_0$ is a constant, or
$A=C_0/(t_c-t)^{\beta/2}$ where $C_0$ is a constant, or
$T=D_0/(t_c-t)^{\beta \cdot z/df}$ where $D_0$ is a constant, or
$\xi=E_0/(t_c-t)^{\beta/df}$ where $E_0$ is a constant, or
$N=F_0/(t_c-t)^{\beta/2}$ where $F_0$ is a constant, or
$dN/dt=G_0/(t_c-t)^{\beta/2}$ where $G_0$ is a constant, or
$S_{ac}=H_0/(t_c-t)^{\alpha\beta}$ where $H_0$ is a constant, or
$A_{ac}=K_0/(t_c-t)^{\alpha\beta/2}$ where $K_0$ is a constant, or
$N_{ac}=L_0/(t_c-t)^{\alpha\beta/2}$ where $L_0$ is a constant, or
$dN_{ac}/dt=M_0/(t_c-t)^{\alpha\beta/2}$ where $M_0$ is a constant, or
$dE/dt=N_0/(t_c-t)^\beta$ where $N_0$ is a constant, or
$dE_{ac}/dt=O_0/(t_c-t)^{\alpha\beta}$ where $O_0$ is a constant, where preferably $\beta=0.5$ and $\alpha=2.6$.

The measurement of event sequences or the measurement of events may be measured in such a way as to determine and/or track a time evolution of one of T, S, $S_{ac}$, $\xi$, N, $N_{ac}$, A, $A_{ac}$, dN/dt and $dN_{ac}/dt$ (and even optionally dE/dt and $dE_{ac}/dt$) as a function of the measurement time t, the calculation of the time $t_c$ preferably comprising a use and/or an interpolation and/or a regression of a function (the expression interpolation and/or regression of a function can mean here generally a description by a function) relating $t_c$, t and the temporal evolution of one of T, S, $S_{ac}$, $\xi$, N, $N_{ac}$, A, $A_{ac}$, dN/dt and $dN_{ac}/dt$ (and even optionally dE/dt and $dE_{ac}/dt$)

said function preferably comprising:

$S=B_0/(t_c-t)^\beta$ where $B_0$ is a constant, or
$A=C_0/(t_c-t)^{\beta/2}$ where $C_0$ is a constant, or
$T=D_0/(t_c-t)^{\beta \cdot z/df}$ where $D_0$ is a constant, or
$\xi=E_0/(t_c-t)^{\beta/df}$ where $E_0$ is a constant, or
$N=F_0/(t_c-t)^{\beta/2}$ where $F_0$ is a constant, or
$dN/dt=G_0/(t_c-t)^{\beta/2}$ where $G_0$ is a constant, or
$S_{ac}=H_0/(t_c-t)^{\alpha\beta}$ where $H_0$ is a constant, or
$A_{ac}=K_0/(t_c-t)^{\alpha\beta/2}$ where $K_0$ is a constant, or
$N_{ac}=L_0/(t_c-t)^{\alpha\beta/2}$ where $L_0$ is a constant, or
$dN_{ac}/dt=M_0/(t_c-t)^{\alpha\beta/2}$ where $M_0$ is a constant, or
$dE/dt=N_0/(t_c-t)^\beta$ where $N_0$ is a constant, or
$dE_{ac}/dt=O_0/(t_c-t)^{\alpha\beta}$ where $O_0$ is a constant, where preferably $\beta=0.5$ and $\alpha=2.6$.

Preferably, there is a ratio greater than or equal to two between the smallest and largest values of T, S, $S_{ac}$, $\xi$, N, $N_{ac}$, A, $A_{ac}$, dN/dt, $dN_{ac}/dt$, dE/dt or $dE_{ac}/dt$ recorded.

Each sequence of events preferably comprises at least three events.

According to still another aspect of the invention, proposed is a structure analysis device comprising:

for at least one sequence of several events located inside the structure, each event being a mechanical damage event or an acoustic event, technical means of measurement:

arranged to measure a sequence of said events comprising a measurement by technical means of a duration T, a mechanical S or acoustic energy $S_{ac}$ and/or a spatial extension $\xi$ of that sequence and/or a number of mechanical N or acoustic $N_{ac}$ events in that sequence and/or of the mechanical A or acoustic $A_{ac}$ energies of the events of that sequence, and/or arranged to measure an event comprising a measurement by the technical means of measurement of a mechanical energy A or acoustic energy $A_{ac}$ of this event, and/or of a temporal frequency of mechanical events dN/dt or acoustic events $dN_{ac}/dt$ at the time of this event, and/or of a dissipated mechanical energy rate dE/dt or of an acoustic energy rate $dE_{ac}/dt$ at the time of this event and computing means arranged and/or programmed to compute, as a function of the measurement of an event and/or the measurement of a sequence of events, a data r representative of a state of health of the structure or of a time $t_c$ to failure of the structure.

The technical means of measurement can be arranged to carry out a measurement of a duration T of this sequence of events.

The technical means of measurement can be arranged to carry out a measurement of a mechanical energy S or acoustic energy $S_{ac}$ of that sequence of events.

The technical means of measurement may comprise several sensors spatially distributed around and/or inside the structure.

The technical means of measurement can be arranged to carry out a measurement of a spatial extension $\xi$ of this sequence of events.

The technical means of measurement can be arranged to perform a measurement of a mechanical energy A or acoustic energy $A_{ac}$ of this event.

The technical means of measurement can be arranged to perform a measurement of the number of mechanical events N or acoustic events $N_{ac}$ in that sequence.

The technical means of measurement can be arranged to perform a measurement of a time frequency of mechanical events dN/dt or acoustic events $dN_{ac}/dt$.

The technical means of measurement can be arranged to perform a measurement of a dissipated mechanical energy rate dE/dt or an acoustic energy rate $dE_{ac}/dt$.

The computing means can be arranged and/or programmed to compute the data r representative of the health status of the structure.

The computing means may be arranged and/or programmed to compute the data r as equal to or proportional to the ratio $\xi/L$ with L a characteristic size of the structure or material composing the structure and $\xi$ the measure of a spatial extension $\xi$ of a sequence of events.

The computing means may be arranged and/or programmed to compute the data r as equal to or proportional to the ratio $\xi/L$ with L a characteristic size of the structure or material composing the structure, $\xi$ depending on the measurement of the energy respectively S or $S_{ac}$ of a sequence of events, $\xi$ depending on:

a constant, respectively $A_0$ or $A_{ac0}$ and a constant $d_0$, and/or respectively S or $S_{ac}$ by a relation relating $\xi$ to $S^{1/df}$ or $S_{ac}^{1/(\alpha \cdot df)}$ respectively, $d_f$ being a constant, $\alpha$ being a constant $\xi$ depending on S or $S_{ac}$ respectively preferably by the relation:

respectively $d_0 \cdot (S/A_0)^{1/df} = \xi$ or $$d_0 \cdot (S_{ac}/A_{ac0})^{1/(\alpha \cdot df)} = \xi$$

$\alpha$ is preferably substantially equal to 2.6, and/or $d_f$ is preferably substantially equal to 1.1 for a two-dimensional structure and substantially equal to 1.5 for a three-dimensional structure.

The computing means may be arranged and/or programmed to compute the data r as equal to or proportional to the ratio $\xi/L$ with L a characteristic size of the structure or material composing the structure, $\xi$ depending on the measurement of the duration T of a sequence of events, $\xi$ depending on:

a constant $\tau_0$ and a constant $d_0$, and/or

T by a relation relating $\xi$ to $(T)^{1/z}$, z being a constant preferably substantially equal to 0.57, $\xi$ preferably depending on T by the relation $\xi = (T/\tau_0)^{1/z} \cdot d_0$ The technical means of measurement can be arranged to perform:

a measurement of $\tau_0$ as the smallest measured event duration of the at least one sequence, and/or a measurement of $A_0$ or $A_{ac0}$ respectively as the energy of the smallest mechanical or acoustic events measured from the at least one sequence.

The computing means may be arranged and/or programmed to compute the data r as equal to or proportional to the ratio $\xi/L$ with L a characteristic size of the structure or material of the structure, $\xi$ depending on the measurement of the energy respectively A or $A_{ac}$ of that event, $\xi$ depending on:

a constant, respectively $A_0$ or $A_{ac0}$ and a constant $d_0$, and/or respectively A or $A_{ac}$ by a relation relating $\xi$ to $A^{2/df}$ or $A_{ac}^{2/(\alpha \cdot df)}$ respectively, $d_f$ being a constant, $\alpha$ being a constant $\xi$ depending on A or $A_{ac}$ respectively preferably by the relation:

respectively $d_0 \cdot (A/A_0)^{2/df} = \xi$ or $$d_0 \cdot (A_{ac}/A_{ac0})^{2/(\alpha \cdot df)} = \xi$$

The computing means may be arranged and/or programmed to compute the data r as equal to or proportional to the ratio $\xi/L$ with L a characteristic size of the structure or material of the structure, $\xi$ depending on the measurement of the energy respectively N or $N_{ac}$ of that event, $\xi$ depending on:

a constant $d_0$, and/or respectively N or $N_{ac}$ by a relation relating $\xi$ to $N^{2/df}$ or $N_{ac}^{2/(\alpha \cdot df)}$ respectively, $d_f$ being a constant, $\alpha$ being a constant $\varepsilon$ depending on N or $N_{ac}$ respectively preferably by the relation:

respectively $d_0 \cdot (N)^{2/df} = \xi$ or $$d_0 \cdot (N_{ac})^{2/(\alpha \cdot df)} = \xi$$

The computing means may be arranged and/or programmed to compute the data r as equal to or proportional to the ratio $\xi/L$ with L a characteristic size of the structure or material of the structure, $\xi$ depending on the measurement of the frequency of respectively mechanical dN/dt or acoustic $dN_{ac}/dt$ events, $\xi$ depending on:

a constant $\Delta T_0$ and a constant $d_0$, and/or respectively dN/dt or $dN_{ac}/dt$ by a relation relating $\xi$ to $(dN/dt)^{2/df}$ or $(dN_{ac}/dt)^{2/(\alpha \cdot df)}$ respectively, $d_f$ being a constant, $\alpha$ being a constant $\xi$ depending on dN/dt or $dN_{ac}/dt$ respectively preferably by the relation:
respectively $d_0 \cdot (\Delta T_0 \cdot dN/dt)^{2/df} = \xi$ or $$d_0 \cdot (\Delta T_0 \cdot dN_{ac}/dt)^{2/(\alpha \cdot df)} = \xi$$

The computing means can be arranged and/or programmed to compute the data r as equal or proportional to the ratio $\xi/L$ with L a characteristic size of the structure or material composing the structure, $\xi$ depending on the measurement of a dissipated mechanical energy rate dE/dt or an acoustic energy rate $dE_{ac}/dt$, $\xi$ depending on:
- a constant respectively $\Delta T_{a0}$ or $\Delta T_{ac0}$, and a constant $d_0$, and/or
- respectively dE/dt or $dE_{ac}/dt$ by a relation relating $\xi$ to $(dE/dt)^{1/df}$ or $(dE_{ac}/dt)^{1/(\alpha \cdot d_f)}$, $d_f$ respectively, $\alpha$ being a constant $\xi$ depending on dE/dt or $dE_{ac}/dt$ respectively preferably by the relation:
respectively $d_0 \cdot (\Delta T_{a0} \cdot dE/dt)^{1/df} = \xi$ or $$d_0 \cdot (\Delta T_{ac0} \cdot dE_{ac}/dt)^{1/(\alpha \cdot df)} = \xi$$

The computing means can be arranged and/or programmed to compute the time $t_c$.

The technical means of measurement can be arranged to carry out the measurement of a sequence of events or the measurement of an event at a measurement time t, the computing means preferably being arranged and/or programmed to compute the time $t_c$ by a use and/or an interpolation and/or a regression of a function (the expression interpolation and/or regression of a function can mean here generally a description by a function) relating $t_c$, t and one of T, S, $S_{ac}$, $\xi$, N, $N_{ac}$, A, $A_{ac}$, dN/dt et $dN_{ac}/dt$ (and even optionally dE/dt and $dE_{ac}/dt$) or the temporal evolution of one of T, S, $S_{ac}$, $\xi$, N, $N_{ac}$, A, $A_{ac}$ dN/dt and $dN_{ac}/dt$ (and even possibly dE/dt and $dE_{ac}/dt$)
said function preferably comprising:
$S = B_0/(t_c - t)^\beta$ where $B_0$ is a constant, or
$A = C_0/(t_c - t)^{\beta/2}$ where $C_0$ is a constant, or
$T = D_0/(t_c - t)^{\beta \cdot z/df}$ where $D_0$ is a constant, or
$\xi = E_0/(t_c - t)^{\beta/df}$ where $E_0$ is a constant, or
$N = F_0/(t_c - t)^{\beta/2}$ where $F_0$ is a constant, or
$dN/dt = G_0/(t_c - t)^{\beta/2}$ where $G_0$ is a constant, or
$S_{ac} = H_0/(t_c - t)^{\alpha \cdot \beta}$ where $H_0$ is a constant, or
$A_{ac} = K_0/(t_c - t)^{\alpha \cdot \beta/2}$ where $K_0$ is a constant, or
$N_{ac} = L_0/(t_c - t)^{\alpha \cdot \beta/2}$ where $L_0$ is a constant, or
$dN_{ac}/dt = M_0/(t_c - t)^{\alpha \cdot \beta/2}$ where $M_0$ is a constant, or
$dE/dt = N_0/(t_c - t)^\beta$ where $N_0$ is a constant, or
$dE_{ac}/dt = O_0/(t_c - t)^{\alpha \cdot \beta}$ where $O_0$ is a constant,
where preferably $\beta = 0.5$ and $\alpha = 2.6$.

The technical means of measurement may be arranged to measure the sequence of events or the measurement of events is measured in such a way as to determine and/or track a time evolution of one of T, S, $S_{ac}$, $\xi$, N, $N_{ac}$, A, $A_{ac}$, dN/dt and $dN_{ac}/dt$ (and even optionally dE/dt and $dE_{ac}/dt$) as a function of the measurement time t, the technical means of measurement preferably being arranged and/or programmed to compute the time $t_c$ preferably comprising a use and/or an interpolation and/or a regression of a function (the expression interpolation and/or regression of a function can mean here generally a description by a function) relating $t_c$, t and the temporal evolution of one of T, S, $S_{ac}$, $\xi$, N, $N_{ac}$, A, $A_{ac}$, dN/dt and $dN_{ac}/dt$ (and even optionally dE/dt and $dE_{ac}/dt$)
said function preferably comprising:
$S = B_0/(t_c - t)^\beta$ where $B_0$ is a constant, or
$A = C_0/(t_c - t)^{\beta/2}$ where $C_0$ is a constant, or
$T = D_0/(t_c - t)^{\beta \cdot z/df}$ where $D_0$ is a constant, or
$\xi = E_0/(t_c - t)^{\beta/df}$ where $E_0$ is a constant, or
$N = F_0/(t_c - t)^{\beta/2}$ where $F_0$ is a constant, or
$dN/dt = G_0/(t_c - t)^{\beta/2}$ where $G_0$ is a constant, or
$S_{ac} = H_0/(t_c - t)^{\alpha \cdot \beta}$ where $H_0$ is a constant, or
$A_{ac} = K_0/(t_c - t)^{\alpha \cdot \beta/2}$ where $K_0$ is a constant, or
$N_{ac} = L_0/(t_c - t)^{\alpha \cdot \beta/2}$ where $L_0$ is a constant, or
$dN_{ac}/dt = M_0/(t_c - t)^{\alpha \cdot \beta/2}$ where $M_0$ is a constant, or
$dE/dt = N_0/(t_c - t)^\beta$ where $N_0$ is a constant, or
$dE_{ac}/dt = O_0/(t_c - t)^{\alpha \cdot \beta}$ where $O_0$ is a constant,
where preferably $\beta = 0.5$ and $\alpha = 2.6$.

Preferably, there is a ratio greater than or equal to two between the smallest and largest values of T, S, $S_{ac}$, $\xi$, N, $N_{ac}$, A, $A_{ac}$, dN/dt, $dN_{ac}/dt$, dE/dt or $dE_{ac}/dt$ recorded.

Each sequence of events preferably comprises at least three events.

BRIEF DESCRIPTION OF THE DRAWINGS

Other benefits and features shall become evident upon examining the detailed description of entirely non-limiting embodiments and implementations, and from the following enclosed drawings:

FIG. 1 shows on its part (a) a first embodiment of a device according to the invention analyzing a structure 5, and is the preferred embodiment of a device according to the invention, and on its part (b) a close-up of the structure FIG. 2 shows the mechanical response of the structure of FIG. 1 as well as, on part (a) the acoustic signal recorded during the loading of the structure highlighting the sequences of acoustic events of energy $S_{ac}$, and on part (b) the evolution of the dissipated mechanical energy highlighting the sequences of mechanical damage events of energy S.

FIG. 3 shows the method used to measure the energy S of the mechanical event sequences from the mechanical response in FIG. 2, FIG. 4 is a close-up of one of the acoustic event sequences of the acoustic signal in FIG. 2(a), FIG. 5 is a close-up of an acoustic event during the sequence in FIG. 4, this event being marked by a star 12 in FIG. 4, FIG. 6 shows the shape of each of the cells composing the structure of FIG. 1 as it is loaded in FIG. 2, this shape being followed during the loading with a camera, so that their level of damage can be tracked, FIG. 7 shows the method used to measure the spatial extension of three sequences of different sizes that took place at different times from the images provided by the camera, FIG. 8 shows the evolution of (a) the energy of the mechanical damage event sequences, (b) their spatial extension, (c) the energy of the acoustic event sequences, (d) the energy of the acoustic events, and (e) the number of acoustic events per sequence measured during a typical experiment, with the rupture taking place around 540 s, when $\xi$ reaches the size L of the structure, FIG. 9 shows the determination of the spatial extension $\xi$ of the sequences from (a) the mechanical energy S of the mechanical sequences, (b) their acoustic energy $S_{ac}$, (c) the energy $A_{ac}$ of the acoustic events, and (d) the number of acoustic events $N_{ac}$ per sequence measured during an experiment and plotted on the different panels of FIG. 8; the breakup occurs around 540 s, when both $\xi_S$, $\xi_{Sac}$, $\xi_{Aac}$ and $\xi_{Nac}$ reach the size L of the structure, FIG. 10 shows in its part (a) a prediction of the time to failure to from the evolution of the mechanical energy S of the sequences over the time range $t < t_{cur}$ and on its part (b)

the predicted time $t_c^{predicted}$ as a function of $t_{cur}$ and compared with the time to failure $t_c$ actually measured during the experiment, FIG. 11 shows, as a function of the residual lifetime ($t_c$−t) of the structure, the evolution of (a) the mechanical energy S of the sequences, (b) their acoustic energy $S_{ac}$, (c) the energy A of the damage events, (d) the energy $A_{ac}$ of the acoustic events, (e) the temporal frequency of the damage events dN/dt, (f) the temporal frequency of the acoustic events $dN_{ac}/dt$, and (g) the spatial extension ξ of the sequences. The power laws represented by straight lines in this logarithmic representation can be used to predict the time to break to by following the procedure described with reference to FIG. 10, FIG. 12 shows different data making it possible to distinguish two successive elementary events belonging to two different sequences, and FIG. 13 is an experimental proof of concept of the suitability of the method according to the invention for more complex materials (such as gypsum) than the 2D cellular material of FIG. 1 or 6.

DETAILED DESCRIPTION

These embodiments are in no way limiting, and in particular, it is possible to consider variants of the invention that comprise only a selection of the features disclosed hereinafter in isolation from the other features disclosed (even if that selection is isolated within a phrase comprising other features), if this selection of features is sufficient to confer a technical benefit or to differentiate the invention with respect to the prior state of the art. This selection comprises at least one preferably functional feature which lacks structural details, and/or only has a portion of the structural details if that portion is only sufficient to confer a technical benefit or to differentiate the invention with respect to the prior state of the art.

First, with reference to FIGS. 1 to 13, a first embodiment of a device 1 according to the invention implementing a first embodiment of a method according to the invention will be described.

The device 1 is based on the quantitative understanding of the link between the intermittency observed during the mechanical response of solids and structures and the evolution of the mechanical health of such a solid or structure. In particular, it takes advantage of this precise understanding to prevent the failure of structures based on the statistical processing of mechanical and acoustic signals.

The present invention enables the mechanical response of a material or structure 5 to be deciphered in order to predict its failure before it occurs. Solids and structures subjected to external compression or shear exhibit the following mode of failure: they become progressively damaged up to a certain localization threshold (corresponding to a critical load level) beyond which this damage localizes according to a localization band. Beyond this threshold, the material or structure is no longer able to withstand mechanical stresses: the deformations accumulate along a band that runs from one end of the sample to the other, and the material separates into two distinct parts: this is called structural failure or break. If not anticipated, this failure can have dramatic consequences, both from an economic and a safety point of view.

In the case of a traction exerted on the structure 5, the failure will be caused by the initiation, then the propagation of a crack. The present invention enables the prediction of crack initiation from the statistical processing of signals emitted by the structure.

The device 1 for analyzing a structure 5, comprises:
for at least one sequence 10 of several events located inside the structure 5, each event being a mechanical damage event or an acoustic event 11, technical means 2 of measurement:
arranged to measure a sequence of said events comprising a measurement by technical means of a duration T, a mechanical S or acoustic energy $S_{ac}$ and/or a spatial extension ξ of that sequence and/or a number of mechanical N or acoustic $N_{ac}$ events in that sequence and/or of the mechanical A or acoustic $A_{ac}$ energies of the events of that sequence, and/or
arranged to measure an event comprising a measurement by the technical means of measurement of a mechanical energy A or acoustic energy $A_{ac}$ of this event, and/or of a temporal frequency of mechanical events dN/dt or acoustic events $dN_{ac}/dt$ at the time of this event, and/or of a dissipated mechanical energy rate dE/dt or of an acoustic energy rate $dE_{ac}/dt$ at the time of this event and
computing means 3 arranged and/or programmed to compute, as a function of the measurement of an event and/or the measurement of a sequence of events, a data r representative of a state of health of the structure or of a time $t_c$ to failure of the structure.

Each of the means of the device 1 is a technical means.

Typically, the computing means 3 comprise at least one computer, a central processing or computing unit, an analog electronic circuit (preferably dedicated), a digital electronic circuit (preferably dedicated), and/or a microprocessor (preferably dedicated), and/or software means.

The time $t_c$ can be an instant (for example date and/or time) when the failure or break of the structure is predicted to occur, or a temporal distance (duration, for example in 3 months, 7 days and 15 hours) to the failure or break of the structure.

We consider the quantity L to which is compared in order to evaluate the mechanical health of the structure:
if the structure 5 is under compression: L is the characteristic size of the structure according to the direction wherein the localization band will emerge. In the example shown in FIG. 1, the localization band is oriented along the horizontal axis, perpendicular to the direction of application of the external force $F_{ext}$, which is applied along the vertical axis. The length L is therefore the size of the structure along the horizontal axis, that is its width, as shown in FIG. 1b.
if the structure 5 is under compression: L is a characteristic size of the material composing the structure, given by the relation L=pi/8 $(K_c/\sigma_c)^2$ where $K_c$ is the toughness of the material (in Pa·m$^{1/2}$) and $\alpha_c$ is the tensile stress at break of the material (or cohesive stress) (in Pa). L is also called the length of the cohesive zone, and represents the size of the damaged zone present in front of a crack. In practice, this size varies from a few hundred microns for metal alloys to a few millimeters for concrete.

We will consider hereafter the case of L for a force in compression, but the present description remains valid for an L as defined above for a force $F_{ext}$ in traction, the structure being able to be monitored by the method according to the invention in compression or traction (or both at the same time, the method according to the invention being then implemented simultaneously twice respectively for the two different definitions of L of the structure 5 in compression or in structure)

FIG. 1 is a photo of a parallelepipedic structure 5 of size L=18 cm under compression. It is made of a cellular material composed of about 1300 elastic hollow polymer cylinders and is subjected to a uni-axial compressive loading 4.

Each of the references 22 of the measuring means 2 in FIG. 1 is an acoustic sensor arranged to measure the acoustic energy $A_{ac}$ of the acoustic events occurring during the damage of the structure 5 preceding its failure.

In this variant, the means 2 may comprise:
- at least one acoustic sensor 22, which makes it possible to measure the acoustic energy $S_{ac}$ of the sequences, their duration T, the acoustic energy $A_{ac}$ of the events constituting the sequences, their temporal frequency $dN_{ac}/dt$ as well as the number $N_{ac}$ of acoustic events per sequence, and/or
- video and/or ultrasound and/or echographic and/or X-ray or other imaging means 6 in order to visualize the structure in two or three dimensions, the imaging means 6 make it possible to measure the spatial extension $\xi$ of the sequences, their mechanical energy S, their duration T, the mechanical energy A of the damage events constituting the sequences, their temporal frequency dN/dt as well as their number N per sequence, and/or
- sensors or gauges of deformation or force which allow to measure the mechanical energy S of the sequences, their duration T, the mechanical energy A of the damage events constituting the sequences, their temporal frequency dN/dt, as well as their number N per sequence.

$\xi$ (also called "dynamic length") cannot be measured from a single image. On the contrary, its measurement requires a succession of images, because it is obtained from the spatial distribution of a set of successive elementary events belonging to the same sequence. In this sense, it is different from a characteristic size that could be extracted from a single image (such as the image of the cumulative damage field at a given time). For this reason, it is said to characterize the size of the dynamic heterogeneities of the damage field, dynamic heterogeneities that can only be revealed by monitoring the evolution of the damage field in the structure over a certain period of time.

The device 1, in particular the measuring means 2 and/or the computing means 3, are arranged and/or programmed to implement the steps of the first method embodiment according to the invention described below.

The invention has been developed from a theoretical and experimental point of view. For the experiments, a 2D model material, a stack of elastic hollow cylinders, was considered, which gives rise to the localization of damage under a sufficiently high stress level, but the present description can be extended to the 3D case.

This system allows a precise characterization of the progress of the damage thanks to:
(i) a camera 6 that films the progress of the deformation and damage of the cylinders during the loading
(ii) the precise measurement of the force 4 and the displacement imposed on the sample 5, which makes it possible to deduce the energy dissipated by damage in the material during the loading. It was thus shown that the progress of the energy dissipated by damage during loading was very intermittent, although the loading itself was increased slowly and regularly. Thus, localized damage "events" in both space and time take place in material 5, and are separated by periods of silence, where the loading of the material is purely elastic. The statistical properties of these damage events are remarkable: far from the failure threshold, they are relatively small. But as the breaking point approaches, their energy becomes greater and greater. Thus, by representing the energy A of these events as a function of the distance to localization, it was thus possible to highlight laws allowing the determination of a data r representative of a state of health of the structure or a time $t_c$ to failure of the structure.

In the present description, "event" or "elementary event" means a mechanical event or an acoustic event.

A "mechanical event" or "damage event" is defined as a localized inelastic deformation within the structure, this event being localized both in space (within the structure) and in time, and being characterized by:
- its energy A
- its duration $\tau_0$ An "acoustic event" is defined as a localized vibration or sound signal generated within the structure 5, this event being localized both in space (within the structure) and in time, and being characterized by:
- its energy $A_{ac}$
- its duration $\tau_{ac0}$ In the present description, a "sequence" is defined as a group of several events taking place successively in time.

The sequences of acoustic events are made up of a succession of elementary acoustic events which are the consequence of each other. These sequences are characterized by:
- their energy $S_{ac}$ (in aJ)
- their duration T (in ms)
- their spatial extension $\xi$ (in mm)
- the number $N_{ac}$ of acoustic events composing the sequence The elementary acoustic events that make up the sequences are characterized by:
- their energy $A_{ac}$ (in aJ)
- their duration $\tau_{ac0}$ (in ms)

The sequences of damage events are made up of a succession of elementary damage events which are the consequence of each other. These sequences are characterized by:
- their energy S (in mJ)
- their duration T (in ms)
- their spatial extension $\xi$ (in mm)
- the number N of damage events composing the sequence These four quantities increase as the structure 5 temporally approaches the break.

A sequence can be defined both mechanically and acoustically in the following way:
- as shown in FIG. 12, two successive elementary events are defined as belonging to two different sequences if the waiting time between them is greater than $\tau^*_w/4$ where the critical waiting time $\tau^*_w$ is defined in FIG. 12 as the waiting time corresponding to the change of regime on the waiting time distribution. Thus:
- the waiting times between two successive elementary events are measured, which provides a set of waiting time values $\{\tau_w\}$ (obtained in general at the beginning of the structure's life, i.e. quite far from its time to break).
- the probability density (that is the histogram) $P(\tau_w)$ of these waiting times is plotted on a logarithmic scale (see FIG. 12(c))
- two regimes are observed: for short waiting times, the distribution is described by a power law $P(\tau_w) \sim 1/(\tau_w)^{\kappa 1}$ with an exponent $\kappa 1$ close to 0.8 (left-hand graph in FIG. 12(c)). For long waiting times, the distribution follows a power law $P(\tau_w) \sim 1/(\tau_w)^{\kappa 2}$ with an exponent κ2 close to 2. The point of intersection between the two power law regressions provides the characteristic waiting time $\tau^*_w$ which is then divided by 4 to find the critical waiting time between two events belonging to two distinct sequences. This definition is shown in FIG. 12(a) where we see sequences (with different colors) comprising elementary events whose waiting times (between each of them) are well below $\tau^*_w$ FIG. 12(b) represents the distribution of waiting times between elementary events belonging to the same sequence (left graph) and the distribution of waiting times between sequences (right graph). FIG. 12(c) is the distribution obtained once all the waiting times are combined (the one available before it is possible to separate the sequences from each other).

There are tests that can be used to verify that the sequences have been correctly identified:
the distribution of waiting times between sequences of the same mechanical or acoustic type (time separating two successive sequences) must follow an exponential law. It will be power-law distributed if the sequences have not been correctly identified.
The frequency of the sequences, that is their number per time interval, is constant and does not vary with the distance to the break. It will be increased by power law if the sequences have not been correctly identified.

The dissipated mechanical energy rate dE/dt is calculated as follows: the total dissipated energy is calculated as the sum ΔE of the energy A of the elementary events over a time interval Δt, whose size is chosen as the minimum of the two values among:
10 times the typical waiting time $\tau^*_w$ or
the smallest time interval during which at least 10 events have been recorded.

The rate of dissipated mechanical energy is then equal to the ratio ΔE/Δt (similarly for $dE_{ac}/dt$). These two quantities also increase as the failure of the structure 5 gets closer in time.

We will use the following nomenclature in the description:

TABLE 1

| | |
|---|---|
| L: | Characteristic length L as defined above depending on whether structure is under compression or traction |
| t: | Time at which the measurement is made |
| $t_c$: | Time to failure of the structure |
| ξ: | Sequence extension |
| S: | Energy of a sequence |
| T: | Duration of a sequence |
| $\Delta T_0$: | Average time between two sequences |
| $ξ_x$: | Spatial extension of a sequence inferred from the measurement x characterizing that sequence (energy, duration, etc.) |
| $d_0$: | Spatial extension of the smallest damage events |
| A: | Energy of a damage event |
| dN/dt: | Frequency of damage events |
| N: | Number of damage events included in a sequence |
| $A_0$: | Energy of the smallest damage events |
| $\tau_0$: | Characteristic duration of a damage event |
| $\tau_{aco}$: | Characteristic duration of an acoustic event |
| $S_{ac}$: | Acoustic energy of a sequence |
| $A_{ac}$: | Acoustic energy of an elementary acoustic event |
| $N_{ac}$: | Number of elementary acoustic events included in a sequence |
| $dN_{ac}/dt$: | Frequency of elementary acoustic events |

Thus, the first embodiment of a method for analyzing a structure 5 according to the invention, comprises:
for at least one sequence 10 of several events located inside the structure 5, each event being a mechanical damage event 11 or an acoustic event:
a measurement of a sequence of said events comprising a measurement by technical means 2 of a duration T, a mechanical S or acoustic energy $S_{ac}$ and/or a spatial extension ξ of that sequence and/or a number of mechanical N or acoustic or $N_{ac}$ events in that sequence and/or of the mechanical A or acoustic $A_{ac}$ energies of the events of that sequence, and/or
a measurement of an event comprising a measurement by the technical means of measurement of a mechanical energy A or acoustic energy $A_{ac}$ of this event, and/or of a temporal frequency of mechanical events dN/dt or acoustic events $dN_{ac}/dt$ at the time of this event, and/or of a dissipated mechanical energy rate dE/dt or of an acoustic energy rate $dE_{ac}/dt$ at the time of this event and
according to the measurement of an event and/or the measurement of a sequence of events, a calculation by technical means 3 of a data r representative of a state of health of the structure or of a time $t_c$ to failure of the structure.

The measurement of a sequence of events comprises:
in a first variant of the first embodiment of the method according to the invention, a measurement by the technical means of measurement of a duration T of that sequence of events. The means 2 then directly measure the duration T of the acoustic or mechanical signal of the sequence and/or
a measurement by the technical means of a mechanical energy S (in a second variant of the first embodiment of the method according to the invention) or acoustic energy $S_{ac}$ (in a seventh variant of the first embodiment of the method according to the invention) of this event sequence. In this second variant, the means 2 allow to determine the mechanical energy S of the sequence from the mechanical signal (obtained from mechanical sensors such as strain gauges or force gauges being part of the means 2) associated with the sequence in the following way: The mechanical energy $A_i$ (i=1 to N) of a damage event of the sequence is determined from the mechanical signal associated with that event and the means 3 calculate S as the sum of $A_i$ (i=1 to N) where N is the number of damage events constituting the sequence. In the seventh variant, the means 2, 22 allow to determine the acoustic energy $S_{ac}$ of the sequence from the acoustic signal associated with the sequence in the following way: the means 2, 22 measure the acoustic energy $A_{ac,i}$ (i=1 to $N_{ac}$) of an acoustic event of the sequence from the acoustic signal associated with this event and the means 3 calculate $S_{ac}$ as the sum of $A_{ac,i}$ (i=1 to $N_{ac}$) where $N_{ac}$ is the number of acoustic events constituting the sequence. The measurement of the mechanical A and acoustic $A_{ac}$ energy of an event can be obtained with the help of several sensors spatially distributed around and/or inside the structure 5, making it possible to locate the event in the structure and thus to take into account the possible attenuation of the signal during its propagation in order to determine with more precision the mechanical A and acoustic $A_{ac}$ energy of each event and/or
in a third variant of the first embodiment of the method according to the invention, a measurement by the technical means of measurement 2 of a spatial extension ξ of that sequence of damage events. In this variant, the means 2 may comprise video and/or ultrasound and/or image correlation and/or ultrasound and/or X-ray or other imaging means 6 to visualize the structure and its damage field in two dimensions or three dimensions and measure ξ, as explained with reference to FIG. 7, and/or a measurement, by the technical means of measurement (22 and/or 6), of the number of mechanical events N (in a fourth variant of the first embodiment of the method according to the invention) or acoustic events $N_{ac}$ (in a ninth variant of the first embodiment of the method according to the invention) in that sequence, and/or the measurement of an event comprises:

a measurement, by the technical means of measurement, of a mechanical energy A (in a fifth variant of the first embodiment of the method according to the invention) or acoustic energy $A_{ac}$ (in an eighth variant of the first embodiment of the method according to the invention) of this event, and/or a measurement, by the technical means, of a temporal frequency of mechanical events dN/dt (in a sixth variant of the first method according to the invention) or acoustic events $dN_{ac}/dt$ (in a tenth variant of the first method according to the invention) and/or a rate of dissipated mechanical energy dE/dt (in an eleventh variant of the method according to the invention) or a rate of acoustic energy $dE_{ac}/dt$ (in an eleventh variant of the method according to the invention) at the time of this event (in a twelfth variant of the method according to the invention).

Thus, for example, FIG. 2 shows:

in part (a) the mechanical response of the structure 5 and the acoustic signal recorded by the sensors 22 during the loading, and in part (b) the mechanical response of the structure 5 and the mechanical signal recorded during the loading by the force gauges and/or strain gauges forming part of the means 2.

The x-axis in FIG. 2 (a) or (b) corresponds to the displacement $\Delta_{ext}$ of the wall 7 pressing on the structure in order to exert the force $F_{ext}$ (which is a uni-axial compressive loading) on the structure 5. This x-axis is therefore directly proportional to time t since $\Delta_{ext}=v_{ext} \cdot t$ where $v_{ext}$ is the constant displacement speed of wall 7.

The mark 8 in FIG. 2 corresponds to the rupture of the structure 5 and thus to the time $t_c$ on the x-axis of FIG. 2.

In FIG. 2, we distinguish:

with reference to the left y-axis, the force $F_{ext}$ (graph 9)

with reference to the right y-axis, in part (a) the acoustic energy $S_{ac}$ of each sequence and in part (b) the mechanical energy S of each sequence. Each peak 10 in part (b) corresponds to a sequence (not all of them have a reference, as there are too many).

We note, with reference to FIGS. 2 and 4, that:

there is a ratio greater than or equal to two between the smallest and largest values of T, S, $S_{ac}$, ξ, N, $N_{ac}$, A, $A_{ac}$, dN/dt, $dN_{ac}/dt$, dE/dt or $dE_{ac}/dt$ recorded, and each sequence of events includes at least three events.

FIG. 3 shows the method used to measure the energy S of the mechanical event sequences from the mechanical response in FIG. 2. Preferably, this is done to measure S. The mechanical energy S dissipated during each sequence is measured from the mechanical response of the structure 5. During each sequence, the response of the structure deviates from the linear elastic behavior. We estimate (see panel FIG. 3(a)) that the applied force remains constant during a sequence, which reproduces the mechanical response that the structure would have had under imposed force loading (our experiments being performed at imposed displacement). An energy balance can then be carried out during a sequence (see panel FIG. 3(b)): the work of the external force ΔW during a sequence counterbalances two otherwise equal contributions: the increase $\Delta E_{el}$ of the elastic energy stored in the structure and the mechanical energy S dissipated by damage during the sequence. S is then obtained by the formula ΔW/2 where ΔW, the work of the external force during the sequence, is equal to the air under the force-displacement graph between the beginning and end of the sequence.

FIG. 4 shows a close-up of a sequence from FIG. 2(a) between $\Delta_{ext}=13.78$ mm and $\Delta_{ext}=13.92$ mm. This sequence is initiated at the time of the force drop $F_{ext}$ and ends when the force drop returns to its initial level. It is composed of a succession of acoustic events whose energy is represented by the vertical bars. Its size $S_{ac}$ is defined as the sum of the energies $A_{ac}$ of each event of that sequence and the number $N_{ac}$ of acoustic events is obtained from the simple count of acoustic events recorded in that sequence.

The x-axis in FIG. 4 corresponds to the displacement $\Delta_{ext}$ of the wall 7 pressing on the structure 5 in order to exert the force $F_{ext}$ (which is a uni-axial compressive loading) on the structure 5. This x-axis is therefore directly proportional to time t since $\Delta_{ext}=v_{ext} \cdot t$ where $v_{ext}$ is the constant displacement speed of wall 7.

In FIG. 4, we distinguish:

with reference to the left y-axis, the force $F_{ext}$ (graph 9)

with reference to the right y-axis, the acoustic energy $A_{ac}$ of each event composing that sequence. Each peak 11 thus corresponds to an event (not all of them have a reference, as there are too many). The means 3 thus determine (thanks to the means 2, in particular the sensors 22):

the acoustic energy $A_{ac}$ of each event in the sequence

The acoustic energy $S_{ac}$ of the sequence (equal to the sum of the $A_{ac}$)

the number $N_{ac}$ of acoustic events of the sequence the duration T of the sequence We note that the number of acoustic events $N_{ac}$ in a sequence is not equal to the number N of mechanical events included in that same sequence. These two quantities are related by the scaling law $N_{ac} \sim N^\alpha$.

The scaling law $A_{ac} \sim A^\alpha$ relates the average energy of the acoustic events $A_{ac}$ of a sequence with the average energy of the mechanical damage events A during that same sequence. Finally, the relation $S_{ac} \sim S^\alpha$ makes it possible to link the acoustic energy of a sequence to its mechanical energy.

FIG. 8 shows the evolution of the energy S, the spatial extension ξ of the energy $S_{ac}$, $A_{ac}$, and $N_{ac}$ of the sequences measured on structure 5 during the experiment. The break occurs around 540 s, when ξ reaches the size L of the structure.

Thus, the means 3 determine and/or track the evolution of the energy S (FIG. 8a) and/or the spatial extension ξ (FIG. 8b), the energy $S_{ac}$ (FIG. 8c), the energy $A_{ac}$ (FIG. 8d), $N_{ac}$ (FIG. 8e) of the energy A, N, of dN/dt, of $dN_{ac}/dt$, and/or of T of the events or sequences as a function of time t and/or as a function of $\Delta_{ext}$ for different events or sequences at different times t of the measurement of an event or sequence of events.

Note in FIG. 4 that each sequence of events may comprise several tens of events.

It is visible in FIG. 4 that the number $N_{ac}$ of acoustic events of the sequence thus determined by the means 3, corresponding to the number of peaks in that FIG. 4.

FIG. 5 shows a zoom on an event 11 marked by marker 12 in FIG. 4. This event 11 is characterized by an energy of $S_{ac}=220$ aJ (aJ meaning attojoule or $10^{-18}$ J), a characteristic frequency of 21 kHz and a duration $\tau_{ac0}=670$ μs.

The x-axis in FIG. 5 corresponds to time t.

On FIG. 5, the acoustic energy (measured in mV by the sensors 22) of this event 11 can be seen with reference to the y-axis. The acoustic energy $A_{ac}$ of this event is calculated as equal or proportional to the square of the envelope of the signal of that event captured by the means 2 and shown in FIG. 5.

FIG. 6 shows a tracking of the shape of each of the cells composing the structure 5 during the loading 4 $\Delta_{ext}$ using the camera 6, so that their displacement as well as their level of damage thus can be tracked, especially for $\Delta_{ext}$=10 mm, $\Delta_{ext}$=15 mm, $\Delta_{ext}$=20 mm, $\Delta_{ext}$=25 mm, and $\Delta_{ext}$=28 mm.

FIG. 7 shows the variation of the damage level of the cells composing the structure 5 between the beginning and the end of a sequence, obtained by the means 3 from the data of FIG. 6; this variation makes it possible to obtain an activity map of the sequence (top panels) highlighting (in gray level) the most active zones during the sequence in the structure 5. This activity map corresponds to the mechanical energy density field $\rho_{dis}$ dissipated during the sequence. This map is then thresholded in order to obtain clusters (where adjacent areas wherein the activity exceeds a certain threshold) on the bottom panels, making it possible to define, by means 3, the spatial extension $\xi$ of the sequence. Here, the spatial extension of the sequence is defined as the length, in the direction of the localization band (i.e., the horizontal direction) of the clusters highlighted by the thresholding. This procedure can be used for several sequence(s) as shown for three sequences of different sizes having taken place at different times corresponding respectively to $\Delta_{ext}$=18 mm, $\Delta_{ext}$=22 mm and $\Delta_{ext}$=24 mm. Here we see the increase in spatial extension $\xi$ of the sequences as the structure is closer to failure (which occurs here when $\Delta_{ext}$=26 mm).

Thus, with reference to part b) of FIG. 8, the means 3 track or determine the progress of the spatial extension $\xi$ of the sequences as a function of time t and/or as a function of $\Delta_{ext}$, after a reiteration (preferably at least 10 iterations) over time for different sequences at different instants t of the measurement of a sequence of events (comprising a measurement by the technical means of measurement 2 of a spatial extension $\xi$ of that sequence of events).

By representing the typical size S as a function of the residual lifetime ($t_c$-t) of the structure, the following law was revealed:

$$S \sim (t_c - t)^{-\beta} \quad (1)$$

where $\beta$=½ (exactly or within 10%). Note that ($t_c$-t) tends to zero as the localization approaches, so equation (1) does reflect the fact that S gets larger and larger as we approach the structure's break.

In the context of the invention, it has been possible to observe that a sequence of size S has the following spatial structure: the locations of damage zones during the sequence are organized into clusters. The size of the largest cluster extends into a disk of characteristic radius $$\xi \sim S^{1/d_f} \quad (2)$$

where $d_f$=1.1 (exactly or within 10%) for a two-dimensional structure $d_f$=1.5 (exactly or within 10%) for a three-dimensional structure.

In other words, as a material approaches failure, the sequences of events that characterize its evolution are increasingly large, both in amplitude (energy dissipated) and in size (spatial extension in the material).

According to the invention, theoretical models have been developed to understand these properties. These theoretical developments are based on damage mechanics, extended to the case of heterogeneous materials. From these models, the invention explains the formulas set forth in this description and the value of the exponents involved in these formulas. In particular, these formulas could be extended to the case of three-dimensional materials, with the only difference that the exponent $d_f$ which characterizes the relationship between the energy of the event and its spatial extension is equal to $d_f$=1.5 in 3D while it is equal to $d_f$=1.1 in 2D. These theoretical developments support the observations made during the experiments, and in particular the phenomenon of amplification of the damage events as the localization approaches.

A key observation is that the breakup occurs when the spatial extension $\xi$ of the sequences becomes equal to the sample size L. Thus, localization occurs when $\xi$=L where L is the size of the sample or structure.

Using equation (2), we deduce that the critical size $S_c$ (in terms of dissipated energy) of the sequences at break is given by $$S_c \sim L^{d_f} \quad (3)$$

The law (3) then makes it possible to foresee and anticipate the rupture. Indeed, S is compared to $S_c$. As long as $S \ll S_c$, structure 5 is far from breaking. The structure or part can safely be used. On the other hand, if S approaches $S_c$, it indicates that the break or the failure of the part is imminent. The value of S, which can be measured from a statistical processing of the signals emitted by the structure 5, represents a measure of the good health of the structure. Indeed, the smaller S is compared to the critical value $S_c$, the healthier the structure is. On the contrary, the closer S is to the critical value $S_c$, the more the structure is in poor health and requires replacement or repair. Appropriate decisions can then be made to minimize the risk of failure by either (i) replacing the part that is about to fail, (ii) repairing the damaged part, or (iii) scrapping the entire structure.

The calculation by means 3 preferably comprises computing the data r=$\xi$/L representative of the health status of the structure.

r is between 0 and 1.

The failure corresponds to r=1, for both definitions of L for a structure in compression or tension.

The lower r is than 1, the farther the structure 5 is from failure.

The data r is computed:

in the third variant, as equal to or proportional to the ratio $\xi$/L with L a characteristic size of the structure or material composing the structure and $\xi$ the measure of a spatial extension $\xi$ of a sequence of events, and/or in the second or seventh variant, as equal to or proportional to the ratio $\xi$/L where L is a characteristic size of the structure or material composing the structure, $\xi$ depending on the measurement of the energy respectively S or $S_{ac}$ of a sequence of events, $\xi$ depending on:

a constant, respectively $A_0$ or $A_{ac0}$ and a constant $d_0$, and/or respectively S or $S_{ac}$ by a relation relating $\xi$ to $S^{1/d_f}$ or $S_{ac}^{1/(\alpha \cdot d_f)}$ respectively, $d_f$ being a constant, $\alpha$ being a constant $\xi$ depending on S or $S_{ac}$ respectively preferably by the relation:

respectively $d_0 \cdot (S/A_0)^{1/d_f} = \xi$ or $$d_0 \cdot (S_{ac}/A_{ac0})^{1/(\alpha \cdot d_f)} = \xi$$

Therefore, r is preferably equal or proportional to $d_0 \cdot (S/A_0)^{1/df}/L$ or $d_0 \cdot (S_{ac}/A_{ac0})^{1/(\alpha \cdot df)}/L$ From S (FIG. 8a), the means 3 therefore compute $\xi_S = d_0 \cdot (S/A_0)^{1/df}$ (shown in FIG. 9a) and then $r = \xi_S/L$ and/or directly $r = \xi_S/L = d_0 \cdot (S/A_0)^{1/df}/L$; and/or in the first variant, as equal to or proportional to the ratio $\xi/L$ where L is a characteristic size of the structure or of the material composing the structure, $\xi$ depending on the measurement of the duration T of a sequence of events, $\xi$ depending on:

a constant $\tau_0$ and a constant $d_0$, and/or

T by a relation relating $\xi$ to $(T)^{1/z}$, z being a constant, $\xi$ preferably depending on T by the relation $\xi = (T/\tau_0)^{1/z} \cdot d_0$, where $\tau_0$, $d_0$ and z are constants.

Therefore, r is preferably equal or proportional to $d_0 (T/\tau_0)^{1/z}/L$

From T, the means 3 therefore compute $\xi_T = d_0 (T/\tau_0)^{1/z}$ then $r = \xi_T/L$ and/or directly $r = \xi_T/L = d_0 (T/\tau_0)^{1/z}/L$ and/or in the fifth or eighth variant, the data r is computed as equal or proportional to the ratio $\xi/L$ where L is a characteristic size of the structure or the material of the structure, $\xi$ depending on the measurement of the respectively mechanical A or acoustic $A_{ac}$ energy of that event, $\xi$ depending on:

a constant, respectively $A_0$ or $A_{ac0}$ and a constant $d_0$, and/or respectively A or $A_{ac}$ by a relation relating $\xi$ to $A^{2/df}$ or $A_{ac}^{2/(\alpha \cdot df)}$ respectively, $d_f$ being a constant, $\alpha$ being a constant $\xi$ depending on A or $A_{ac}$ respectively preferably by the relation:

respectively $d_0 \cdot (A/A_0)^{2/df} = \xi$ or $$d_0 \cdot (A_{ac}/A_{ac0})^{2/(\alpha \cdot df)} = \xi$$

Therefore, r is preferably equal or proportional to $d_0 \cdot (A/A_0)^{2/df}/L$ or $d_0 \cdot (A_{ac}/A_{ac0})^{2/(\alpha \cdot df)}/L$; and/or in the fourth or ninth variant, as equal to or proportional to the ratio $\xi/L$ where L is a characteristic size of the structure or material of the structure, $\xi$ depending on the measurement of the number of respectively mechanical N or acoustic $N_{ac}$ events in that sequence, $\xi$ depending on:

a constant $d_0$, and/or respectively N or $N_{ac}$ by a relation relating $\xi$ to $N^{2/df}$ or $N_{ac}^{2/(\alpha \cdot df)}$ respectively, $d_f$ being a constant, $\alpha$ being a constant $\xi$ depending on N or $N_{ac}$ respectively preferably by the relation:

respectively $d_0 \cdot (N)^{2/df} = \xi$ or $$d_0 \cdot (N_{ac})^{2/(\alpha \cdot df)} = \xi$$

Therefore, r is preferably equal or proportional to $d_0 \cdot (N)^{2/df}/L$ or $d_0 \cdot (N_{ac})^{2/(\alpha \cdot df)}/L$ in the sixth or tenth variant, as equal or proportional to the ratio $\xi/L$ with L a characteristic size of the structure or material composing the structure, $\xi$ depending on the measurement of the frequency of respectively mechanical dN/dt or acoustic $dN_{ac}/dt$ events, $\xi$ depending on:

a constant $\Delta T_0$ and a constant $d_0$, and/or respectively dN/dt or $dN_{ac}/dt$ by a relation relating $\xi$ to $(dN/dt)^{2/df}$ or $(dN_{ac}/dt)^{2/(\alpha \cdot df)}$ respectively, $d_f$ being a constant, $\alpha$ being a constant $\xi$ depending on dN/dt or $dN_{ac}/dt$ respectively preferably by the relation:

respectively $d_0 \cdot (\Delta T_0 \cdot dN/dt)^{2/df} = \xi$ or $$d_0 \cdot (\Delta T_0 \cdot dN_{ac}/dt)^{2/(\alpha \cdot df)} = \xi$$

Therefore, r is preferably equal or proportional to $d_0 \cdot (\Delta T_0 \cdot dN/dt)^{2/df}/L$ or $d_0 \cdot (\Delta T_0 \cdot dN_{ac}/dt)^{2/(\alpha \cdot df)}/L$ $\Delta T_0$ is the average waiting time between two successive sequences.

$\Delta T_0$ is measured by means 2 and/or computed by means 3.

in the eleventh or twelfth variant, as equal or proportional to the ratio $\xi/L$ with L a characteristic size of the structure or material composing the structure, $\xi$ depending on the measurement of a dissipated mechanical energy rate dE/dt or an acoustic energy rate $dE_{ac}/dt$, $\xi$ depending on:

a constant respectively $\Delta T_{a0}$ or $\Delta \tau_{ac0}$, and a constant $d_0$, and/or respectively dE/dt or $dE_{ac}/dt$ by a relation relating $\xi$ to $(dE/dt)^{1/df}$ or $(dE_{ac}/dt)^{1/(\alpha \cdot df)}$, $d_f$ respectively, $\alpha$ being a constant $\xi$ depending on dE/dt or $dE_{ac}/dt$ respectively preferably by the relation:

respectively $d_0 \cdot (\Delta T_{a0} \cdot dE/dt)^{1/df} = \xi$ or $$d_0 \cdot (\Delta \tau_{ac0} \cdot dE_{ac}/dt)^{1/(\alpha \cdot df)} = \xi$$

Therefore, r is preferably equal or proportional to $d_0 \cdot (\Delta T_{a0} \cdot dE/dt)^{1/df}/L$ or $$d_0 \cdot (\Delta \tau_{ac0} \cdot dE_{ac}/dt)^{1/(\alpha \cdot df)}/L$$

$\Delta T_{a0}$ (respectively $\Delta \tau_{ac0}$) are constants equal to the inverse of the smallest dissipated mechanical energy rate (respectively acoustic energy rate) generally measured far from the break.

The value of $d_0$ is dependent on the material of the structure 5, and is stored by the means 3. $d_0$ corresponds to the spatial extension of the smallest damage events which can be determined by the means 3 and/or directly in the memory of the means 3. $d_0$ corresponds to the elementary microstructural size of the material, such as its grain size. In the example of FIG. 1, $d_0$ is the diameter of the cylinders composing the cellular material.

$\alpha$ is equal to 2.6 (exactly or within 10%).

The value of $\alpha$ is stored by the means 3.

The value of $d_f$ is stored by the means 3.

$d_f$ is equal to 1.1 (exactly or within 10%) for a two-dimensional structure and equal to 1.5 (exactly or within 10%) for a three-dimensional structure.

The value of z is stored by the means 3.

z is equal to 0.57 (exactly or within 10%) for a two-dimensional structure and equal to 0.65 (exactly or within 10%) for a three-dimensional structure.

The value of L is dependent on the structure 5, and is stored by the means 3, preferably under two values $L = L_1$ for the structure 5 in compression and $L = L_2$ for the structure 5 in tension.

$A_0$ (energy of the smallest events) is measured by the device 1 by means 2 (22 and/or 6) and/or calculated by means 3 as for S and/or stored by means 3.

$\tau_0$ (characteristic duration of a damage event) is measured by the device 1 by the means 2 (22 and/or 6) and/or calculated by the means 3 (for example, by the data in FIG. 5) and/or stored by the means 3.

Typically, the first embodiment of the method according to the invention comprises:

a measurement of $\tau_0$ as the smallest measured event duration of the at least one sequence, and/or a measurement of $A_0$ or $A_{ac0}$ respectively as the energy of the smallest mechanical or acoustic events measured from the at least one sequence.

The first embodiment of the method according to the invention comprises calculating the time $t_c$.

In this embodiment, each measurement of a sequence of events or each measurement of an event is measured at a measurement time t.

This first embodiment includes, in particular for the calculation of $t_c$:
- a reiteration (preferably at least 10 iterations) in time for different sequences at different times t of the measurement of a sequence of events, and/or
- a reiteration (preferably at least 10 iterations) in time for different events at different times t of the measurement of an event The calculation of the time $t_c$ comprising a use and/or an interpolation and/or a regression of a function (the expression interpolation and/or a regression of a function in this description can mean generally a description by a function) relating $t_c$, t and one of T, S, $S_{ac}$, $\xi$, N, $N_{ac}$, A, $A_{ac}$, dN/dt and $dN_{ac}/dt$, dE/dt, and $dE_{ac}/dt$, or the temporal evolution of one of T, S, $S_{ac}$, $\xi$, N, $N_{ac}$, A, $A_{ac}$, dN/dt, $dN_{ac}/dt$, dE/dt and $dE_{ac}/dt$.

said function preferably comprising:

$S=B_0/(t_c-t)^\beta$ where $B_0$ is a constant, in the second variant, or $A=C_0/(t_c-t)^{\beta/2}$ where $C_0$ is a constant, in the fifth variant, or $T=D_0/(t_c-t)^{\beta \cdot z/df}$ where $D_0$ is a constant, in the first variant, or $\xi=E_0/(t_c-t)^{\beta/df}$ where $E_0$ is a constant, in the third variant, or $N=F_0/(t_c-t)^{\beta/2}$ where $F_0$ is a constant, in the fourth variant, or $dN/dt=G_0/(t_c-t)^{\beta/2}$ where $G_0$ is a constant, in the sixth variant, or $S_{ac}=H_0/(t_c-t)^{\alpha \cdot \beta}$ where $H_0$ is a constant, in the seventh variant, or $A_{ac}=K_0/(t_c-t)^{\alpha \cdot \beta/2}$ where $K_0$ is a constant, in the eighth variant, or $N_{ac}=L_0/(t_c-t)^{\alpha \cdot \beta/2}$ where $L_0$ is a constant, in the ninth variant, or $dN_{ac}/dt=M_0/(t_c-t)^{\alpha \cdot \beta/2}$ where $M_0$ is a constant, in the tenth variant, or $dE/dt=N_0/(t_c-t)^\beta$ where $N_0$ is a constant, in the eleventh variant, or $dE_{ac}/dt=O_0/(t_c-t)^{\alpha \cdot \beta}$ where $O_0$ is a constant, in the twelfth variant, where $B_0$ $C_0$ $D_0$ $E_0$ $F_0$ $G_0$ $H_0$ $K_0$ $L_0$ $M_0$ $N_0$ or $O_0$, respectively, is a constant whose value is not required for interpolation and/or regression or the method according to the invention.

The values of $\beta$ and $\alpha$ are stored by the means 3.

$t_{cur}$ is the time at which the means 3 determine $t_c$, this calculation being based on several measurements at different times t before or equal to $t_{cur}$.

Thus, for example, FIG. 10 shows:

In its part a), the prediction of the time to break $t_c$ from the progress of the energy S of the sequences over the time range $t<t_{cur}$.

In its part b), the predicted breakup time $t_c^{predicted}$ is plotted as a function of $t_{cur}$ and compared with the breakup time $t_c$ actually measured during the experiment.

Thus, with reference to FIG. 10, the procedure for predicting the time to break is based on the progress law of the sequence energy, i.e. for instance in the first variant:

$$S=B_0/(t_c-t)^\beta$$

where $B_0$ is a constant and $\beta=\frac{1}{2}$. From this relation, we can write $$S^{1/\beta} t = S^{1/\beta} t_c + B_0$$

By introducing the variables $Y=S^{1/\beta} \cdot t$ and $X=S^{1/\beta}$, we then obtain the relation:

$$Y(X)=t_c X+B_0$$

A linear regression of the function Y(X) then provides the time to break $t_c$, which corresponds to the slope of the function Y(X). The uncertainty on $t_c$ (shown in FIG. 10) is deduced from the quality of the linear regression.

Similarly, all quantities with a power-law relationship with the distance ($t_c$-t) to the break are likely to be used for the prediction of $t_c$ on the same principle, according to variants 1 to 10. In particular, the sequence duration T (first variant) as well as their spatial extension $\xi$ (third variant) or N (fourth variant) can be used via the previously described relations.

Alternatively, one can also use the elementary damage events (the energy A of the elementary damage events for the fifth variant or their frequency (number of events per unit time) dN/dt for the sixth variant) to predict the time to failure, as shown in FIG. 11.

FIG. 11 shows the evolution of the mechanical energy S and acoustic energy $S_{ac}$ of the sequences (panels (a) and (b)), the energy A and $A_{ac}$ of the damage events and acoustic events, their temporal frequency dN/dt and $dN_{ac}/dt$, and the spatial extension $\xi$ of the sequences, as a function of the residual lifetime ($t_c$-t) of the structure. Power laws are used to predict the time to break to following the procedure with reference to FIG. 10.

FIG. 13 is an experimental proof of concept of the suitability of the method according to the invention for more complex materials (such as gypsum) than the 2D cellular material of FIG. 1 or 6.

The sample is a plaster cylinder (diameter—20 mm; height—30 mm).

This FIG. 13 (taken from experiments performed on plaster samples, i.e. on a three-dimensional material, which is widely used in civil engineering) shows:

- in its part a), the experimental device including in particular the device allowing the measurement of the acoustic events (but not measurements by camera, which are useless here because the plaster is three-dimensional). This FIG. 13*a*) is analogous to FIG. 1(*a*) and the common reference numbers are therefore not described again.
- in its part b), the mechanical force-displacement response of the sample (indicating the break at the force peak) as well as the evolution in time (and acceleration near the break) of the acoustic events. This FIG. 13*b*) is analogous to FIG. 2(*a*) and the common reference numbers are therefore not described again.
- in its part c), the prediction of the residual lifetime from the method according to the invention. This FIG. 13*c*) is analogous to FIG. 10(*a*) or (*b*) and the common reference numbers are therefore not described again. Here, we show that acoustic events can also be used to predict failure (the previous example on 2D cellular material used mechanical events)

The table below summarizes the method for computing r:

TABLE 2

| Variant | Parameter | Prediction | Data measured by the means 2 | Formula used by the means 3 |
|---|---|---|---|---|
| (1) | $\xi$ | $r_\xi = \dfrac{\xi}{L}$ | $\xi$, L | — |
| (2) | $\xi_s$ | $r_{\xi_s} = \dfrac{\xi_s}{L}$ | S, L | $\dfrac{\xi_s}{d_o} = \left(\dfrac{S}{A_o}\right)^{\frac{1}{d_f}}$<br>$d_f = 1.1\ (2d);\ 1.5\ (3d)$ |
| (3) | $\xi_T$ | $r_{\xi_T} = \dfrac{\xi_T}{L}$ | T, L | $\dfrac{\xi_T}{d_o} = \left(\dfrac{T}{\tau_o}\right)^{\frac{1}{z}}$<br>$z = 0.57\ (2d);\ 0.65\ (3d)$ |
| (4) | $\xi_A$ | $r_{\xi_{(A)}} = \dfrac{\xi_{(A)}}{L}$ | A, L | $\dfrac{\xi_A}{d_o} = \left(\dfrac{A}{A_o}\right)^{\frac{2}{d_f}}$<br>$d_f = 1.1\ (2d);\ 1.5\ (3d)$ |
| (5) | $\xi_N$ | $r_{N_A} = \dfrac{\xi_N}{L}$ | N, L | $\dfrac{\xi_{N_A}}{d_o} = (N)^{\frac{2}{d_f}}$<br>$d_f = 1.1\ (2d);\ 1.5\ (3d)$ |
| (6) | $\xi_{\frac{dN}{dt}}$ | $r_{N_A} = \dfrac{\xi_{\frac{dN}{dt}}}{L}$ | $\dfrac{dN}{dt}$, L | $\dfrac{\xi_{N_A}}{d_o} = \left(\Delta T_o \dfrac{dN}{dt}\right)^{\frac{2}{d_f}}$<br>$d_f = 1.1\ (2d);\ 1.5\ (3d)$ |
| (7) | $\xi_{s_{ac}}$ | $r_{s_{ac}} = \dfrac{\xi_s}{L}$ | $S_{ac}$, L | $\dfrac{\xi_{s_{ac}}}{d_o} = \left(\dfrac{S_{ac}}{A_{ac_o}}\right)^{\frac{1}{\alpha d_f}}$<br>$d_f = 1.1\ (2d);\ 1.5\ (3d);\ \alpha = 2.6$ |
| (8) | $\xi_{s_{ac}}$ | $r_{A_{ac}} = \dfrac{\xi_{A_{ac}}}{L}$ | $A_{ac}$, L | $\dfrac{\xi_{A_{ac}}}{d_o} = \left(\dfrac{A_{ac}}{A_{ac_o}}\right)^{\frac{2}{(\alpha d_f)}}$<br>$d_f = 1.1\ (2d);\ 1.5\ (3d)$ |
| (9) | $\xi_{N_{ac}}$ | $r_{N_{ac}} = \dfrac{\xi_{N_{ac}}}{L}$ | $N_{ac}$, L | $\dfrac{\xi_{N_{ac}}}{d_o} = (N_{ac})^{\frac{2}{(\alpha d_f)}}$<br>$d_f = 1.1\ (2d);\ 1.5\ (3d);\ \alpha = 2.6$ |
| (10) | $\xi_{\frac{dN_{ac}}{dt}}$ | $r_{N_{ac}} = \dfrac{\xi_{\frac{dN_{ac}}{dt}}}{L}$ | $\dfrac{dN_{ac}}{dt}$, L | $\dfrac{\xi_{N_{ac}}}{d_o} = \left(\Delta T_o \dfrac{dN_{ac}}{dt}\right)^{\frac{2}{\alpha d_f}}$<br>$d_f = 1.1\ (2d);\ 1.5\ (3d);\ \alpha = 2.6$ |
| (11) | $\xi_{\frac{dE}{dt}}$ | $r_{\xi_A} = \dfrac{\xi_{\frac{dE}{dt}}}{L}$ | $\dfrac{dE}{dt}$, L | $\dfrac{\xi_{\frac{dE}{dt}}}{d_o} = \left(\Delta T_{ao} \dfrac{dE}{dt}\right)^{\frac{1}{d_f}}$<br>$d_f = 1.1\ (2d);\ 1.5\ (3d)$ |
| (12) | $\xi_{\frac{dE_{ac}}{dt}}$ | $r_{A_{ac}} = \dfrac{\xi_{\frac{dE_{ac}}{dt}}}{L}$ | $\dfrac{dE_{ac}}{dt}$, L | $\dfrac{\xi_{\frac{dE_{ac}}{dt}}}{d_o} = \left(\Delta T_{aco} \dfrac{dE_{ac}}{dt}\right)^{\frac{1}{\alpha d_f}}$<br>$d_f = 1.1\ (2d);\ 1.5\ (3d);\ \alpha = 2.6$ |

The table below summarizes the method for computing $t_c$:

TABLE 3

| Variant | Parameters | Data measured by the means 2 | Formula used by the means 3 |
|---|---|---|---|
| (1) | T | T, t | $T \sim (t_c - t)^{-\beta \cdot \frac{z}{d_f}}$<br>$\beta \cdot \dfrac{z}{d_f} = 0.26\ (2d);\ 0.22\ (3d)$ |
| (2) | S | S, t | $S \sim (t_c - t)^{-\beta}$<br>$\beta = \dfrac{1}{2}$ |
| (3) | $\xi$ | $\xi$, t | $\xi \sim (t_c - t)^{-\frac{\beta}{d_f}}$<br>$d_f = 1.1\ (2d);\ 1.5\ (3d)$ |

TABLE 3-continued

| Variant | Parameters | Data measured by the means 2 | Formula used by the means 3 |
|---|---|---|---|
| (4) | $N$ | $N, t$ | $N \sim (t_c - t)^{-\frac{\beta}{2}}$<br>$\beta = \frac{1}{2}$ |
| (5) | $A$ | $A, t$ | $A \sim (t_c - t)^{-\frac{\beta}{2}}$<br>$\beta = \frac{1}{2}$ |
| (6) | $\frac{dN}{dt}$ | $\frac{dN}{dt}, t$ | $\frac{dN}{dt} \sim (t_c - t)^{-\frac{\beta}{2}}$<br>$\beta = \frac{1}{2}$ |
| (7) | $S_{ac}$ | $S_{ac}, t$ | $S_{ac} \sim (t_c - t)^{-\alpha\beta}$<br>$\beta = \frac{1}{2}; \alpha = 2.6$ |
| (8) | $A_{ac}$ | $A_{ac}, t$ | $A_{ac} \sim (t_c - t)^{-\frac{\alpha\beta}{2}}$<br>$\beta = \frac{1}{2}; \alpha = 2.6$ |
| (9) | $N_{ac}$ | $N_{ac}, t$ | $N_{ac} \sim (t_c - t)^{-\frac{\alpha\beta}{2}}$<br>$\beta = \frac{1}{2}; \alpha = 2.6$ |
| (10) | $\frac{dN_{ac}}{dt}$ | $\frac{dN_{ac}}{dt}, t$ | $\frac{dN_{ac}}{dt} \sim (t_c - t)^{-\frac{\alpha\beta}{2}}$<br>$\beta = \frac{1}{2}; \alpha = 2.6$ |
| (11) | $\frac{dE}{dt}$ | $\frac{dE}{dt}, t$ | $\frac{dE}{dt} \sim (t_c - t)^{-\beta}$<br>$\beta = \frac{1}{2}$ |
| (12) | $\frac{dE_{ac}}{dt}$ | $\frac{dE_{ac}}{dt}, t$ | $\frac{dE_{ac}}{dt} \sim (t_c - t)^{-\alpha\beta}$<br>$\beta = \frac{1}{2}; \alpha = 2.6$ |

The table below summarizes the values of the exponents $z$ and $d_f$:

TABLE 4

| Case | $z$ | $d_f$ | $\beta z/d_f$ |
|---|---|---|---|
| Two-dimensional structure 5 | 0.57 | 1.10 | 0.26 |
| Three-dimensional structure 5 | 0.65 | 1.50 | 0.22 |

The prediction of the failure of structures or mechanical parts is a major issue in all industrial sectors for which the mechanical strength of materials plays an important role. We cite here as examples three possible implementations of the invention in three distinct domains:

(i) nuclear: nuclear structures, both metal alloy tanks and concrete structures of power plants, are subject to high stresses (mechanical, but also sometimes thermal or even radioactive) that put their mechanical integrity to a severe test, over particularly long periods of time, up to several decades. These structures or materials are heavily monitored, as risk prevention in this type of activity is central. Access to the signals needed to implement the technology is therefore relatively easy. The method described in this invention potentially makes it possible to decipher these signals, and thus to estimate the state of damage of the structure as well as the duration over which it can still remain in service.

(ii) aeronautics: the materials used in the fuselage of an aircraft (such as its wings) are particularly closely monitored, because of the serious accidents that a rupture could cause. The proposed technology makes it possible to translate the signals (of deformation, acoustic emission, etc.) measured in situ, in flight or at rest, in terms of damage level. It makes it possible to thus determine the level of wear of the device. This analysis can help to establish more precisely the number of flights that an aircraft can still make before being scrapped, a matter that remains a major technological and commercial issue in this sector.

(iii) civil engineering. Important structures such as dams or bridges are monitored with sensors to assist the engineer in determining the risk of failure. However, determining the mechanical health of the structure remains a particularly difficult task. The technology according to the invention makes it possible to quantitatively analyze the signals recorded on the structure, and to implement the most precise risk prevention policy possible, while allowing an estimate of the remaining life of the structure.

This list is far from being exhaustive and the applications of the invention relates to all industrial fields for which the mechanical strength of a part or structure is an important issue.

Of course, the invention is not limited to the examples just described, and many adjustments can be made to these examples without going beyond the scope of the invention.

Of course, the various features, forms, variants and embodiments of the invention may be combined with each other in various combinations as long as they are not incompatible or exclusive of each other. In particular, all the variants and embodiments described above can be combined with each other.

The invention claimed is:

1. A method for analyzing a structure, comprising:
for at least one sequence of several events located inside the structure-, each event being a mechanical damage event or an acoustic event:
a measurement of a sequence of said events comprising a measurement by technical means of measurement of a duration T, a mechanical S or acoustic energy $S_{ac}$ and/or a spatial extension $\xi$ of that sequence and/or a number of mechanical N or acoustic $N_{ac}$ events in that sequence and/or of the mechanical A or acoustic $A_{ac}$ energies of the events of that sequence; and/or
a measurement of one of said events comprising a measurement by the technical means of measurement of a mechanical energy A or acoustic energy $A_{ac}$ of this event, and/or of a temporal frequency of mechanical events $dN/dt$ or acoustic events $dN_{ac}/dt$ at the time of this event and/or of a dissipated mechanical energy rate $dE/dt$ or of an acoustic energy rate $dE_{ac}/dt$ at the time of this event;
each measurement being implemented by at least one among at least one acoustic sensor, video means, ultrasound means, echographic means, X-ray imaging means, image correlation means, deformation sensors, force sensors, a deformation gauge, and a force gauge,
according to the measurement of events and/or the measurement of a sequences of events, a calculation, by technical means of calculation comprising at least one among a computer, a central processing or computing unit, an analog electronic circuit, a digital electronic circuit, and a microprocessor of:
a data r representative of a state of health of the structure, the data r being calculated as equal or proportional to a ratio $\xi/L$ with L a characteristic size of the structure or of the material composing the structure and $\xi$ a measure of a spatial extension $\xi$ of a sequence of the events or $\xi$ depending on the measure of S or Sac or T or N or Nac or A or Aac or dN/dt or dNac/dt or dE/dt or dEac/dt, or
a time $t_c$ to failure of the structure, the measurement of sequences of the events or the measurement of the events being measured so as to determine and/or follow a temporal evolution of one of T, S, Sac, $\xi$, N, Nac, A, Aac, dN/dt, dNac/dt, dE/dt and dEac/dt as a function of the measurement time t, the calculation of the time tc comprising a use and/or an interpolation and/or a regression of a function linking tc, t to the temporal evolution of one of T, S, Sac, $\xi$, N, Nac, A, Aac, dN/dt, dNac/dt, dE/dt and dEac/dt.

2. The method according to claim 1, characterized in that the measurement of the sequence of the events comprises a measurement by the technical means of measurement of the duration T of that sequence of the events.

3. The method according to claim 2, characterized in that the calculation comprises a calculating of the data r representative of the health status of the structure and in that the data r is computed as equal to or proportional to the ratio $\xi/L$ with L a characteristic size of the structure or the material composing the structure, $\xi$ depending on the measurement of the duration T of a sequence of events, $\xi$ depending on:
a constant $\tau_0$ and a constant $d_0$, and/or
T by a relation relating $\xi$ to $(T)^{1/z}$, z being a constant, $\xi$ preferably depending on T by the relation $\xi=(T/\tau_0)^{1/z} \cdot d_0$.

4. The method according to claim 1, characterized in that the measurement of the sequence of the events comprises a measurement by the technical means of measurement of the mechanical energy S or the acoustic energy $S_{ac}$ of that sequence of the events.

5. The method according to claim 4, characterized in that the measurement of mechanical energy S or acoustic energy $S_{ac}$ is obtained by several sensors spatially distributed around and/or inside the structure.

6. The method according to claim 4, characterized in that the calculation comprises a calculating of the data r representative of the health status of the structure and in that the data r is computed as equal to or proportional to the ratio $\xi/L$ with L a characteristic size of the structure or the material composing the structure, $\xi$ depending on the measurement of the energy respectively S or $S_{ac}$ of a sequence of the events, $\xi$ depending on:
a constant, respectively $A_0$ or $A_{ac0}$ and a constant $d_0$, and/or
respectively S or $S_{ac}$ by a relation relating $\xi$ to $S^{1/df}$ or $S_{ac}^{1/(\alpha \cdot df)}$ respectively, df being a constant, a being a constant
$\xi$ depending on S or $S_{ac}$ respectively preferably by the relation:
respectively $d_0 \cdot (S/A_0)^{1/df} = \xi$ or
$$d_0 \cdot (S_{ac}/A_{ac0})^{1/(\alpha \cdot df)} = \xi.$$

7. The method according to claim 6, characterized in that $\alpha$ is substantially equal to 2.6, and/or $d_f$ is substantially equal to 1.1 for a two-dimensional structure and substantially equal to 1.5 for a three-dimensional structure.

8. The method according to claim 6, characterized in that it comprises:
a measurement of $\tau_0$ as a smallest measured event duration of the at least one sequence, and/or
a measurement of $A_0$ or $A_{ac0}$ respectively as the energy of a smallest mechanical or acoustic event measured from the at least one sequence.

9. The method according to claim 1, characterized in that the measurement of a sequence of the events comprises a measurement by the technical means of measurement of a spatial extension $\xi$ of that sequence of the events.

10. The method according to claim 9, characterized in that the calculation comprises a calculating of the data r representative of the health status of the structure, and in that the data r is computed as equal to or proportional to the ratio $\xi/L$ with L a characteristic size of the structure or material composing the structure and $\xi$ the measure of a spatial extension $\xi$ of a sequence of the events.

11. The method according to claim 1, characterized in that the measurement of one of the events comprises a measurement by the technical means of measurement of a mechanical energy A or acoustic energy $A_{ac}$ of that event.

12. The method according to claim 11, characterized in that the calculation comprises a calculating of the data r representative of the health status of the structure and in that the data r is computed as equal to or proportional to the ratio $\xi/L$ with L a characteristic size of the structure or the material of the structure, $\xi$ depending on the measurement of the energy respectively A or $A_{ac}$ of a sequence of events, $\xi$ depending on:
a constant, respectively $A_0$ or $A_{ac0}$ and a constant $d_0$, and/or
respectively A or $A_{ac}$ by a relation relating $\xi$ to $A^{2/df}$ or $A_{ac}^{2/(\alpha \cdot df)}$ respectively, $d_f$ being a constant, $\alpha$ being a constant
$\xi$ depending on A or $A_{ac}$ respectively preferably by the relation:
respectively $d_0 \cdot (A/A_0)^{2/df} = \xi$ or
$$d_0 \cdot (A_{ac}/A_{ac0})^{2/(\alpha \cdot df)} = \xi.$$

13. The method according to claim 1, characterized in that the measurement of a sequence of the events comprises a measurement by the technical means of measurement of the number of mechanical events N or acoustic events $N_{ac}$ in that sequence.

14. The method according to claim 13, characterized in that the calculation comprises a calculating of the data r representative of the health status of the structure and in that the data r is computed as equal to or proportional to the ratio $\xi/L$ with L a characteristic size of the structure or the material of the structure, $\xi$ depending on the measurement of the respectively mechanical N or acoustic $N_{ac}$ energy in that sequence, $\xi$ depending on:
a constant $d_0$, and/or
respectively N or $N_{ac}$ by a relation relating $\xi$ to $N^{2/df}$ or $N_{ac}^{2/(\alpha \cdot df)}$ respectively, $d_f$ being a constant, $\alpha$ being a constant
$\xi$ depending on N or $N_{ac}$ respectively preferably by the relation:
respectively $d_0 \cdot (N)^{2/df} = \xi$ or
$$d_0 \cdot (N_{ac})^{2/(\alpha \cdot df)} = \xi.$$

15. The method according to claim 1, characterized in that the measurement of one of the events comprises a measurement by the technical means of measurement of a temporal frequency of mechanical events dN/dt or acoustic events $dN_{ac}/dt$.

16. The method according to claim 15, characterized in that the calculation comprises a calculating of the data r representative of the health status of the structure and in that the data r is computed as equal to or proportional to the ratio $\xi/L$ with L a characteristic size of the structure or the material of the structure, $\xi$ depending on the measurement of the frequency of respectively mechanical dN/dt or acoustic $dN_{ac}/dt$ events, $\xi$ depending on:

a constant $\Delta T_0$ and a constant $d_0$, and/or respectively dN/dt or $dN_{ac}/dt$ by a relation relating $\xi$ to $(dN/dt)^{2/df}$ or $(dN_{ac}/dt)^{2/(\alpha \cdot df)}$ respectively, $d_f$ being a constant, $\alpha$ being a constant $\xi$ depending on dN/dt or $dN_{ac}/dt$ respectively preferably by the relation:

respectively $d_0 \cdot (\Delta T_0 \cdot dN/dt)^{2/df} = \xi$ or $$d_0 \cdot (\Delta T_0 \cdot dN_{ac}/dt)^{2/(\alpha \cdot df)} = \xi.$$

17. The method according to claim 1, characterized in that the calculation comprises a calculating of the data r representative of the health status of the structure.

18. The method according to claim 1, characterized in that the computing comprises computing the time $t_c$.

19. The method according to claim 18, characterized in that the measurement of event sequences or the measurement of events may be measured in such a way as to determine and/or track a time evolution of one of T, S, $S_{ac}$, $\xi$, N, $N_{ac}$, A, $A_{ac}$, dN/dt and $dN_{ac}/dt$, dE/dt and $dE_{ac}/dt$ as a function of the measurement time t, the calculation of the time to comprising a use and/or an interpolation and/or a regression of a function relating $t_c$, t and the temporal evolution of one of T, S, $S_{ac}$, $\xi$, N, $N_{ac}$, A, $A_{ac}$, dN/dt, $dN_{ac}/dt$, dE/dt and $dE_{ac}/dt$ said function preferably comprising:
$S = B_0/(t_c - t)^\beta$ where $B_0$ is a constant, or
$A = C_0/(t_c - t)^{\beta/2}$ where $C_0$ is a constant, or
$T = D_0/(t_c - t)^{\beta \cdot z/df}$ where $D_0$ is a constant, or
$\xi = E_0/(t_c - t)^{\beta/df}$ where $E_0$ is a constant, or
$N = F_0/(t_c - t)^{\beta/2}$ where $F_0$ is a constant, or
$dN/dt = G_0/(t_c - t)^{\beta/2}$ where $G_0$ is a constant, or
$S_{ac} = H_0/(t_c - t)^{\alpha\beta}$ where $H_0$ is a constant, or
$A_{ac} = K_0/(t_c - t)^{\alpha\beta/2}$ where $K_0$ is a constant, or
$N_{ac} = L_0/(t_c - t)^{\alpha\beta/2}$ where $L_0$ is a constant, or
$dN_{ac}/dt = M_0/(t_c - t)^{\alpha\beta/2}$ where $M_0$ is a constant, or
$dE/dt = N_0/(t_c - t)^\beta$ where $N_0$ is a constant, or
$dE_{ac}/dt = O_0/(t_c - t)^{\alpha \cdot \beta}$ where $O_0$ is a constant,
where preferably $\beta = 0.5$ and $\alpha = 2.6$.

20. The method according to claim 18, wherein there is a ratio greater than or equal to two between a smallest value and a largest value of T, S, $S_{ac}$, $\xi$, N, $N_{ac}$, A, $A_{ac}$, dN/dt, $dN_{ac}/dt$, dE/dt or $dE_{ac}/dt$ recorded.

21. The method according to claim 1, characterized in that each sequence of events comprises at least five events.

22. A device for analyzing a structure, comprising:

for at least one sequence of several events located inside the structure, each event being a mechanical damage event or an acoustic event, technical means of measurement comprising at least one taken from the group consisting of at least one acoustic sensor, video means, ultrasound means, echographic means, X-ray imaging means, image correlation means, deformation sensors, force sensors, deformation gauge, force gauge, and:

arranged to measure a sequence of said events comprising a measurement by technical means of a duration T, a mechanical S or acoustic energy $S_{ac}$ and/or a spatial extension $\xi$ of that sequence and/or a number of mechanical N or acoustic $N_{ac}$ events in that sequence and/or of a mechanical A or acoustic $A_{ac}$ energies of the events of that sequence; and/or arranged to measure one of the events comprising a measurement by the technical means of measurement of a mechanical energy A or acoustic energy $A_{ac}$ of this event, and/or of a temporal frequency of mechanical events dN/dt or acoustic events $dN_{ac}/dt$ at the time of this event, and/or of a dissipated mechanical energy rate dE/dt or of an acoustic energy rate $dE_{ac}/dt$ at the time of this event; and computing means comprising at least one taken from the group consisting of a computer, a central processing or computing unit, an analog electronic circuit, a digital electronic circuit, and a microprocessor, and arranged and/or programmed to compute, as a function of the measurement of events and/or the measurement of sequences of events:

a data r representative of a state of health of the structure, the calculation means being arranged and/or programmed to calculate the data r as equal or proportional to a ratio $\xi/L$ with L a characteristic size of the structure or of the material composing the structure and $\xi$ a measure of a spatial extension $\xi$ of a sequence of events or $\xi$ depending on the measure of S or Sac or T or N or Nac or A or Aac or dN/dt or dNac/dt or dE/dt or dEac/dt, or a time $t_c$ to failure of the structure, the technical means of measurement being arranged to carry out the measurement of sequences of events or the measurement of events so as to determine and/or follow a temporal evolution of one of T, S, $S_{ac}$, $\xi$, N, Nac, A, Aac, dN/dt, dNac/dt, dE/dt and dEac/dt as a function of the measurement time t, the calculation of the time tc comprising a use and/or an interpolation and/or a regression of a function linking tc, t to the temporal evolution of one of T, S, Sac, $\xi$, N, Nac, A, Aac, dN/dt, dNac/dt, dE/dt and dEac/dt.

* * * * *